United States Patent
Wang et al.

(10) Patent No.: US 10,420,009 B2
(45) Date of Patent: Sep. 17, 2019

(54) METHODS AND DEVICES FOR DETERMINING AND USING DEVICE-TO-DEVICE RELAY NODE

(71) Applicant: CHINA ACADEMY OF TELECOMMUNICATIONS TECHNOLOGY, Beijing (CN)

(72) Inventors: Ying Wang, Beijing (CN); Huiying Zhang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 16 days.

(21) Appl. No.: 15/564,155

(22) PCT Filed: Mar. 10, 2016

(86) PCT No.: PCT/CN2016/076079
§ 371 (c)(1),
(2) Date: Oct. 3, 2017

(87) PCT Pub. No.: WO2016/161867
PCT Pub. Date: Oct. 13, 2016

(65) Prior Publication Data
US 2018/0084481 A1 Mar. 22, 2018

(30) Foreign Application Priority Data

Apr. 8, 2015 (CN) .......................... 2015 1 0163673

(51) Int. Cl.
*H04W 40/22* (2009.01)
*H04W 12/06* (2009.01)
(Continued)

(52) U.S. Cl.
CPC .......... *H04W 40/22* (2013.01); *H04W 8/005* (2013.01); *H04W 12/06* (2013.01); *H04W 24/08* (2013.01);
(Continued)

(58) Field of Classification Search
CPC ... H04W 40/22; H04W 40/246; H04W 88/04; H04W 8/005; H04W 12/06; H04W 24/08; H04W 48/16; H04W 4/70; H04W 28/0247
See application file for complete search history.

(56) References Cited

U.S. PATENT DOCUMENTS 8,023,552 B2   9/2011  Balachandran et al.
9,319,955 B2 *  4/2016  Kim .................. H04W 36/0016
(Continued)

FOREIGN PATENT DOCUMENTS

CN   1860748    11/2006
CN   101883048  11/2010
(Continued)

OTHER PUBLICATIONS

International Search Report for PCT/CN2016/076079 dated May 31, 2016, and its English translation provided by WIPO.
(Continued)

*Primary Examiner* — Tejis Daya
(74) *Attorney, Agent, or Firm* — Ladas & Parry, LLP

(57) ABSTRACT

The present disclosure provides a method for determining a D2D relay node, including steps of: measuring, by a first UE, its own running state; in the case that the first UE determines that its own running state meets a predetermined condition in accordance with a measurement result, determining the first UE as a relay node; and notifying, by the first UE, other UEs currently using a D2D link that the first UE is the relay node via a PC5 interface.

16 Claims, 9 Drawing Sheets

(51) Int. Cl.
*H04W 24/08* (2009.01)
*H04W 48/16* (2009.01)
*H04W 8/00* (2009.01)
*H04W 88/04* (2009.01)
*H04W 40/24* (2009.01)
*H04W 28/02* (2009.01)
*H04W 4/70* (2018.01)

(52) U.S. Cl.
CPC ......... *H04W 40/246* (2013.01); *H04W 48/16* (2013.01); *H04W 88/04* (2013.01); *H04W 4/70* (2018.02); *H04W 28/0247* (2013.01)

(56) References Cited

U.S. PATENT DOCUMENTS

| | | | |
|---|---|---|---|
| 9,888,348 B2* | 2/2018 | Xiao | G01S 5/10 |
| 2007/0002766 A1 | 1/2007 | Park et al. | |
| 2012/0300662 A1* | 11/2012 | Wang | H04W 72/02 370/252 |
| 2013/0316727 A1* | 11/2013 | Edge | H04W 4/02 455/456.1 |
| 2014/0171062 A1 | 6/2014 | Fallgren et al. | |
| 2014/0192637 A1* | 7/2014 | Ou | H04W 72/048 370/228 |
| 2014/0295827 A1* | 10/2014 | Tesanovic | H04W 76/14 455/426.1 |
| 2014/0329535 A1* | 11/2014 | Sadiq | H04W 76/14 455/452.2 |
| 2015/0029866 A1* | 1/2015 | Liao | H04W 4/023 370/241 |
| 2015/0078301 A1* | 3/2015 | Toth | H04W 4/08 370/329 |
| 2015/0126188 A1* | 5/2015 | Lindoff | H04W 8/005 455/434 |
| 2015/0215982 A1* | 7/2015 | Siomina | H04W 76/14 370/328 |
| 2015/0271856 A1 | 9/2015 | Tong et al. | |
| 2015/0327315 A1* | 11/2015 | Xue | H04L 5/0044 370/330 |
| 2015/0334757 A1* | 11/2015 | Seo | H04W 24/08 370/329 |
| 2016/0037385 A1* | 2/2016 | Boudreau | H04W 76/14 370/328 |
| 2016/0044613 A1* | 2/2016 | Cai | H04W 56/00 370/315 |
| 2016/0088468 A1* | 3/2016 | Sharma | H04W 4/24 370/329 |
| 2016/0100442 A1* | 4/2016 | Xu | H04W 76/14 370/329 |
| 2016/0192418 A1* | 6/2016 | Yang | H04W 76/14 370/252 |
| 2016/0198329 A1* | 7/2016 | Lee | H04W 8/005 455/434 |
| 2016/0198516 A1* | 7/2016 | Kim | H04W 76/14 370/312 |
| 2016/0204847 A1* | 7/2016 | Ryu | H04B 7/15507 455/7 |
| 2016/0212780 A1* | 7/2016 | Stojanovski | H04W 76/14 |
| 2016/0234754 A1* | 8/2016 | Baghel | H04W 40/22 |
| 2017/0019833 A1* | 1/2017 | Luo | H04W 40/24 |
| 2017/0111945 A1* | 4/2017 | Yi | H04L 67/1078 |
| 2017/0230919 A1* | 8/2017 | Siomina | H04W 52/346 |
| 2017/0347338 A1* | 11/2017 | Chen | H04W 8/005 |

FOREIGN PATENT DOCUMENTS

| | | |
|---|---|---|
| CN | 104080097 A | 10/2014 |
| CN | 104158581 A | 11/2014 |
| EP | 2785092 A1 | 10/2014 |
| JP | 2008271523 A | 11/2008 |
| WO | 2010118578 | 10/2010 |
| WO | 2014051126 A1 | 4/2014 |
| WO | 2015/020460 A1 | 2/2015 |
| WO | 2015/026111 A1 | 2/2015 |
| WO | 2015015242 A1 | 2/2015 |
| WO | 2015/047167 A1 | 4/2015 |

OTHER PUBLICATIONS

Written Opinion of the International Search Authority for PCT/CN2016/076079 dated May 31, 2016, and its English translation provided by Bing.Com Microsoft Translate.
From CN201310175457.1, 1st office action dated Apr. 1, 2017 and its English translation from Espacenet Global Dossier.
From CN201310175457.1, 2nd office action dated Apr. 21, 2017 and its English translation from Espacenet Global Dossier.
From CN201310175457.1, 3rd office action dated Aug. 14, 2017 and its English translation from Espacenet Global Dossier.
From CN201310175457.1, First search report dated Dec. 21, 2016.
From EPO Application No. 16776042.0, Extended European Search Report and Search Opinion dated Feb. 16, 2018.
From TW Application No. 105109624, Office Action dated Apr. 20, 2017 with machine English translation.
International Preliminary Report on Patentability (IPRP; Ch. 1) for PCT/CN2016/076079 dated Oct. 19, 2017, and its English translation provided by WIPO.
Written Opinion of the International Search Authority for PCT/CN2016/076079 dated Jun. 2, 2016, and its English translation provided by WIPO.
From JP 2017-551646, Notification of Reasons for Refusal, dated Nov. 6, 2018, with machine English translation from JPO.
Samsung and Introduction of ProSe and 3GPP, TSG-RAN WG 2#89, 3GPP, Mar. 3, 2015, R2-150734, pp. 32-33.

* cited by examiner (a) Model A (b) Model B (a) Model A

METHODS AND DEVICES FOR DETERMINING AND USING DEVICE-TO-DEVICE RELAY NODE

CROSS-REFERENCE TO RELATED APPLICATIONS

This application is the U.S. national phase of PCT Application No. PCT/CN2016/076079 filed on Mar. 10, 2016, which claims priority to the Chinese Patent Application No. 201510163673.3 filed on Apr. 8, 2015, the disclosures of which are incorporated in their entireties by reference herein.

TECHNICAL FIELD

The present disclosure relates to the field of communication technology, in particular to methods and devices for determining and using a Device-to-Device (D2D) relay node.

BACKGROUND

For the future development of a mobile communication system, a D2D technology is introduced to meet user's requirement in a better manner. The D2D technology refers to the data transmission between adjacent User Equipments (UEs) within a short range through a direct link, without any need to being forwarded by a central node (i.e., a base station) nor being transmitted through a conventional cellular link.

For a $3^{rd}$ Generation Partnership Project (3GPP), a D2D proximity service includes D2D discovery and D2D communication, as shown in FIG. 1.

For the D2D discovery, one UE may determine that another UE is located adjacent to it through an Evolved Universal Mobile Telecommunications System (UMTS) Terrestrial Radio Access Network (E-UTRAN). For example, through the D2D discovery, the UE may search for a taxi or a friend adjacent to it.

For the D2D communication, a network communication link may be converted to a local direct communication link, to save a bandwidth and increase the network efficiency. A link may be directly established between two UEs in proximity to each other (as shown in FIG. 1), so it is able to achieve the communication, through the direct link, between the two UEs which configured to communicate with each other through the network communication link, thereby to provide a communication service in a stable, high-speed and cheap manner. Usually, the proximity service communication is controlled or aided by a network side device, and even an evolved NodeB (eNB) may dynamically allocate resources for the UEs for the proximity service communication.

In the related art, a D2D relay scenario includes a UE-to-network relay scenario and a UE-to-UE relay scenario.

As shown in FIG. 2, for the UE-to-network relay scenario, a remote UE is in an off-network state. Because the remote UE cannot access to the network, and a UE-to-network relay node may function as to enable the remote UE to access to the network for unicast communication. The UE-to-network relay node may route service data related to public safety (including downlink (DL)/uplink (UL) data) between the remote UE and the network.

For the UE-to-UE relay scenario, a public-safety UE may have a relay function. The public-safety UE that has the relay function may be configured to forward data between two public-safety UEs. As shown in FIG. 3, a public-safety UE 1 is not located adjacent to a public-safety UE 2, a public-safety UE 3 is located adjacent to the public-safety UE 1 and the public-safety UE2. In addition, the public-safety UE 3 may have the relay function. In the case that the public-safety UE 1 wants to communicate with the public-safety UE 2, the public-safety UE 3 may serve as the relay node and forward the data between the public-safety UE 1 and the public-safety UE 2.

It can therefore be seen that, in a conventional D2D discovery or D2D communication mechanism, during the proximity discovery procedure, a UE that initiates the communication can merely acquire information about the UEs adjacent thereto, but cannot know which UEs have the relay function, so it is impossible for the UE to select an appropriate UE-to-network relay node or UE-to-UE relay node to access to the network or perform the communication. In addition, there is currently no mechanism for activating or deactivating the relay function of the relay node. Hence, the data transmission efficiency and accuracy for the D2D discovery and D2D communication are severely limited.

SUMMARY

An object of the present disclosure is to provide methods and devices for determining and using a D2D relay node, so as to solve the problem in the related art where the D2D discovery efficiency is low due to the fact that the relay function of the relay node cannot be activated.

In one aspect, the present disclosure provides in some embodiments a method for determining a D2D relay node, including steps of: measuring, by a first UE, its own running state; in the case that the first UE determines that its own running state meets a predetermined condition in accordance with a measurement result, determining the first UE as a relay node, the running state being configured to at least describe a privilege or a running environment or a processing ability of the first UE; and notifying, by the first UE, other UEs currently using a D2D link that the first UE is the relay node via a PC5 interface.

According to the method in the embodiments of the present disclosure, it is able to quickly determine the relay node for the data transmission during the D2D discovery or D2D communication, thereby to improve the D2D discovery or D2D communication efficiency.

In a possible embodiment of the present disclosure, the step of measuring, by the first UE, its own running state includes at least one of the following steps: acquiring, by the first UE, a network-side authentication result with respect to its own relay privilege; acquiring, by the first UE, a load of a current access network; acquiring, by the first UE, a signal quality measurement value of its own $U_U$ interface; acquiring, by the first UE, a current service handling capability of the first UE; acquiring, by the first UE, its own geographical position; acquiring, by the first UE, its own movement speed; and acquiring, by the first UE, a relay demand of for a current remote UE.

In a possible embodiment of the present disclosure, the step of, in the case that the first UE determines that its own running state meets the predetermined condition in accordance with the measurement result, determining the first UE as the relay node includes at least one of the following steps: in the case that the first UE determines that the relay privilege is allowed to be used in accordance with the network-side authentication result with respect to its own relay privilege, determining the first UE as the relay node; in the case that the first UE determines that the load of the current access network is smaller than a predetermined threshold, determining the first UE as the relay node; in the case that the first UE determines that the signal quality measurement value of its own $U_U$ interface is greater than a predetermined threshold, determining the first UE as the relay node; in the case that the first UE determines that the current service handling capability of the first UE is greater than a predetermined threshold, determining the first UE as the relay node; in the case that the first UE determines that the first UE is located at a cell edge, determining the first UE as the relay node; in the case that the first UE determines that its own movement speed is smaller than a predetermined threshold, determining the first UE as the relay node; and in the case that the first UE determines that the relay demand of the current remote UE is greater than a predetermined threshold, determining the first UE as the relay node.

In a possible embodiment of the present disclosure, the step of notifying, by the first UE, the other UEs currently using the D2D link that the first UE is the relay node via the PC5 interface includes: notifying, by the first UE, the other UEs currently using the D2D link that the first UE is the relay node through a Radio Resource Control (RRC) message via the PC5 interface, the RRC message carrying a relay indicator and an identifier of the first UE; or notifying, by the first UE, the other UEs currently using the D2D link that the first UE is the relay node through a Master Information Block-Side Link (MIB-SL) message via the PC5 interface, the MIB-SL message carrying the relay indicator and the identifier of the first UE.

In a possible embodiment of the present disclosure, subsequent to the step of notifying, by the first UE, the other UEs currently using the D2D link that the first UE is the relay node via the PC5 interface, the method further includes: in the case that the first UE determines that its own running state does not meet the predetermined condition in accordance with the measurement result, notifying, by the first UE, the other UEs currently using the D2D link that the first UE is not the relay node via the PC5 interface; and periodically measuring, by the first UE, its own running state.

In a possible embodiment of the present disclosure, the method further includes: receiving, by the first UE, a relay discovery message from a remote UE within a predetermined range, the relay discovery message carrying target relay indicators and/or relay node identifiers; and in the case that the first UE determines in accordance with the relay discovery message that its own identifier successfully matches any target relay indicator and/or relay node identifier, transmitting, by the first UE, a relay discovery response message to the remote UE, to indicate the remote UE to establish the D2D communication.

In another aspect, the present disclosure provides in some embodiments a method for using a D2D relay node, including steps of: receiving, by a remote UE, notification messages from other UEs within a predetermined range, the notification message being transmitted in the case that the other UE has determined that its own running state meets a predetermined condition, the running state being configured to at least describe a privilege or a running environment or a processing ability of any of the other UEs; and determining, by the remote UE, whether or not any of the other UEs is the relay node in accordance with the notification message.

According to the method in the embodiments of the present disclosure, it is able to quickly determine the relay node for the data transmission during the D2D discovery or D2D communication, thereby to improve the D2D discovery or D2D communication efficiency.

In a possible embodiment of the present disclosure, the step of determining, by the UE, whether or not any of the other UEs is the relay node in accordance with the notification message includes: acquiring, by the remote UE, a notification message from any of the other UEs, and in the case that a relay indicator carried in the notification message from any other the other UEs indicates a relay activation state, determining the any of the other UEs as the relay node, the notification message carrying a relay activation indicator and/or an identifier of the UE; or acquiring, by the remote UE, a notification message from any of the other UEs, and in the case that a relay indicator carried in the notification message from any of the other UEs indicates a relay deactivation state, determining the any of the other UEs as the relay node, the notification message carrying a relay activation indicator and/or an identifier of the UE.

In a possible embodiment of the present disclosure, the method further includes: broadcasting, by the remote UE, a relay discovery message via a PC5 interface, the relay discovery message carrying a target relay indicator and/or an identifier for the remote UE; and upon the receipt of a relay discovery response message returned by the other relay node with respect to the relay discovery message, initiating, by the remote UE, the establishment of the D2D communication through the other relay node.

In a possible embodiment of the present disclosure, the method further includes: in the case that the remote UE needs to perform D2D connection with another remote UE, initiating, by the remote UE, the establishment of the D2D communication through the relay node; or in the case that the remote UE needs to perform Device-to-Network (D2N) connection with a network side device, initiating, by the remote UE, the establishment of the D2N communication through the relay node.

In yet another aspect, the present disclosure provides in some embodiments a method for determining a D2D relay node, including steps of: receiving, by a first UE, a relay discovery message from a remote UE within a predetermined range, the relay discovery message carrying target relay indicators and/or relay node identifiers; and in the case that the first UE has determined in accordance with the relay discovery message that its own identifier successfully matches any target relay indicator and/or relay node identifier, transmitting, by the first UE, a relay discovery response message to the remote UE, to indicate the remote UE to perform the D2D communication.

According to the method in the embodiments of the present disclosure, it is able to quickly use the relay node for the data transmission during the D2D discovery or D2D communication, thereby to improve the D2D discovery or D2D communication efficiency.

In still yet another aspect, the present disclosure provides in some embodiments a method for using a D2D relay node, including steps of: broadcasting, by a remote UE, a relay discovery message via a PC5 interface, the relay discovery message carrying a target relay indicator and/or an identifier of the remote UE; and upon the receipt of a relay discovery response message returned by a relay node with respect to the relay discovery message, initiating, by the remote UE, the establishment of the D2D communication through the relay node.

According to the method in the embodiments of the present disclosure, it is able to rapidly discover and use the relay node for the data transmission during the D2D discovery or D2D communication, thereby to improve the D2D discovery or D2D communication efficiency.

In a possible embodiment of the present disclosure, the step of broadcasting, by the remote UE, the relay discovery message via the PC5 interface includes: broadcasting, by the remote UE, the relay discovery message to other UEs currently using a D2D link through a RRC message via the PC5 interface; or broadcasting, by the remote UE, the relay discovery message to the other UEs currently using the D2D link through an MIB-SL message via the PC5 interface.

In a possible embodiment of the present disclosure, the method further includes: in the case that the remote UE needs to establish D2D connection with another remote UE, initiating, by the remote UE, the establishment of the D2D communication through the relay node; or in the case that the remote UE needs to establish D2N connection with another remote UE, initiating, by the remote UE, the establishment of the D2N communication through the relay node.

In still yet another aspect, the present disclosure provides in some embodiments a UE for determining a D2D relay node, including: a measurement unit configured to measure its own running state; a determination unit configured to, in the case that it is determined that its own running state meets a predetermined condition in accordance with a measurement result, determine the UE as a relay node, the running state being configured to at least describe a privilege or a running environment or a processing ability of the UE; and a notification unit configured to notify other UEs currently using a D2D link that the UE is the relay node via a PC5 interface.

According to the UE in the embodiments of the present disclosure, it is able to quickly determine the relay node for the data transmission during the D2D discovery or D2D communication, thereby to improve the D2D discovery or D2D communication efficiency.

In a possible embodiment of the present disclosure, in the case of measuring its own running state, the measurement unit is further configured to acquire at least one of: a network-side authentication result with respect to its own relay privilege; a load of a current access network; a signal quality measurement value of its own $U_U$ interface; a current service handling capability of the UE; its own geographical position; its own movement speed; and a relay demand of for a current remote UE.

In a possible embodiment of the present disclosure, in the case of determining the UE as the relay node, the determination unit is further configured to perform at least one of the following operations: in the case that the relay privilege is allowed to be used in accordance with the network-side authentication result with respect to its own relay privilege, determine the UE as the relay node; in the case that the load of the current access network is smaller than a predetermined threshold, determine the UE as the relay node; in the case that the signal quality measurement value of its own $U_U$ interface is greater than a predetermined threshold, determine the UE as the relay node; in the case that the current service handling capability of the first UE is greater than a predetermined threshold, determine the UE as the relay node; in the case that the first UE is located at a cell edge, determine the UE as the relay node; in the case that its own movement speed is smaller than a predetermined threshold, determine the UE as the relay node; and in the case that the relay demand of the current remote UE is greater than a predetermined threshold, determine the UE as the relay node.

In a possible embodiment of the present disclosure, in the case of notifying the other UEs currently using the D2D link that the UE is the relay node via the PC5 interface, the notification unit is further configured to: notify the other UEs currently using the D2D link that the UE is the relay node through a RRC message via the PC5 interface, the RRC message carrying a relay indicator and an identifier of the UE; or notify the other UEs currently using the D2D link that the UE is the relay node through an MIB-SL message via the PC5 interface, the MIB-SL message carrying the relay indicator and the identifier of the UE.

In a possible embodiment of the present disclosure, subsequent to notifying the other UEs currently using the D2D link that the UE is the relay node via the PC5 interface, the notification unit is further configured to, in the case that its own running state does not meet the predetermined condition in accordance with the measurement result, notify the other UEs currently using the D2D link that the UE is not the relay node via the PC5 interface, and the measurement unit is further configured to periodically measure its own running state.

In a possible embodiment of the present disclosure, the notification unit is further configured to: receive a relay discovery message from a remote UE within a predetermined range, the relay discovery message carrying target relay indicators and/or relay node identifiers; and in the case that its own identifier successfully matches any target relay indicator and/or relay node identifier in accordance with the relay discovery message, transmit a relay discovery response message to the remote UE, to indicate the remote UE to establish the D2D communication.

In still yet another aspect, the present disclosure provides in some embodiments a UE using a D2D relay node, including: a communication unit configured to receive notification messages from other UEs within a predetermined range, the notification message being transmitted in the case that the other UE has determined that its own running state meets a predetermined condition, the running state being configured to at least describe a privilege or a running environment or a processing ability of any of the other UEs; and a determination unit configured to determine whether or not any of the other UEs is the relay node in accordance with the notification message.

According to the device in the embodiments of the present disclosure, it is able to quickly use the relay node for the data transmission during the D2D discovery or D2D communication, thereby to improve the D2D discovery or D2D communication efficiency.

In a possible embodiment of the present disclosure, in the case of determining whether or not any of the other UEs is the relay node in accordance with the notification message, the determination unit is further configured to: acquire a notification message from any of the other UEs, and in the case that a relay indicator carried in the notification message from any other the other UEs indicates a relay activation state, determine the any of the other UEs as the relay node, the notification message carrying a relay activation indicator and/or an identifier of the UE; or acquire a notification message from any of the other UEs, and in the case that a relay indicator carried in the notification message from any of the other UEs indicates a relay deactivation state, determine the any of the other UEs as the relay node, the notification message carrying a relay activation indicator and/or an identifier of the UE.

In a possible embodiment of the present disclosure, the communication unit is further configured to: broadcast a relay discovery message via a PC5 interface, the relay discovery message carrying a target relay indicator and/or a relay node identifier of the UE; and upon the receipt of a relay discovery response message returned by the other relay node with respect to the relay discovery message, initiate the establishment of the D2D communication through the other relay node.

In a possible embodiment of the present disclosure, the communication unit is further configured to: in the case that the UE needs to perform D2D connection with another remote UE, initiate the establishment of the D2D communication through the relay node; or in the case that the UE needs to perform D2N connection with a network side device, initiate the establishment of the D2N communication through the relay node.

In still yet another aspect, the present disclosure provides in some embodiments a UE for determining a D2D relay node, including: a reception unit configured to receive a relay discovery message from a remote UE within a predetermined range, the relay discovery message carrying target relay indicators and/or relay node identifiers; and a processing unit configured to, in the case that its own identifier successfully matches any target relay indicator and/or relay node identifier in accordance with the relay discovery message, transmit a relay discovery response message to the remote UE, to indicate the remote UE to perform the D2D communication.

According to the UE in the embodiments of the present disclosure, it is able to quickly use the relay node for the data transmission during the D2D discovery or D2D communication, thereby to improve the D2D discovery or D2D communication efficiency.

In still yet another aspect, the present disclosure provides in some embodiments a UE for using a D2D relay node, including: a first communication unit configured to broadcast a relay discovery message via a PC5 interface, the relay discovery message carrying a target relay indicator and/or a relay node identifier of the UE; and a second communication unit configured to, upon the receipt of a relay discovery response message returned by a relay node with respect to the relay discovery message, initiate the establishment of the D2D communication through the other relay node.

According to the UE in the embodiments of the present disclosure, it is able to rapidly discover and use the relay node for the data transmission during the D2D discovery or D2D communication, thereby to improve the D2D discovery or D2D communication efficiency.

In a possible embodiment of the present disclosure, in the case of broadcasting the relay discovery message via the PC5 interface, the first communication unit is further configured to: broadcast the relay discovery message to other UEs currently using a D2D link through a RRC message via the PC5 interface; or broadcast the relay discovery message to the other UEs currently using the D2D link through an MIB-SL message via the PC5 interface.

In a possible embodiment of the present disclosure, the second communication unit is further configured to: in the case that the UE needs to establish D2D connection with another remote UE, initiate the establishment of the D2D communication through the other relay node; or in the case that the UE needs to establish D2N connection with another remote UE, initiate the establishment of the D2N communication through the other relay node.

In still yet another aspect, the present disclosure provides in some embodiments a UE, including a processor, a memory and a transceiver. The processor is configured to read a program stored in the memory, to: measure its own running state; in the case that its own running state meets a predetermined condition in accordance with a measurement result, determine the UE as a relay node, the running state being configured to at least describe a privilege or a running environment or a processing ability of the UE; and notify through the transceiver other UEs currently using a D2D link that the UE is the relay node via a PC5 interface. The transceiver is configured to receive and transmit data under the control of the processor. The processor takes charge of managing the bus architecture as well as general processings. The memory is configured to store therein data for the operation of the processor.

According to the UE in the embodiments of the present disclosure, it is able to quickly determine the relay node for the data transmission during the D2D discovery or D2D communication, thereby to improve the D2D discovery or D2D communication efficiency.

In a possible embodiment of the present disclosure, in the case of measuring its own running state, the processor is further configured to acquire at least one of: a network-side authentication result with respect to its own relay privilege; a load of a current access network; a signal quality measurement value of its own $U_U$ interface; a current service handling capability of the UE; its own geographical position; its own movement speed; and a relay demand of for a current remote UE.

In a possible embodiment of the present disclosure, in the case of determining the UE as the relay node, the processor is further configured to perform at least one of the following operations: in the case that the relay privilege is allowed to be used in accordance with the network-side authentication result with respect to its own relay privilege, determine the UE as the relay node; in the case that the load of the current access network is smaller than a predetermined threshold, determine the UE as the relay node; in the case that the signal quality measurement value of its own $U_U$ interface is greater than a predetermined threshold, determine the UE as the relay node; in the case that the current service handling capability of the first UE is greater than a predetermined threshold, determine the UE as the relay node; in the case that the first UE is located at a cell edge, determine the UE as the relay node; in the case that its own movement speed is smaller than a predetermined threshold, determine the UE as the relay node; and in the case that the relay demand of the current remote UE is greater than a predetermined threshold, determine the UE as the relay node.

In a possible embodiment of the present disclosure, in the case of notifying through the transceiver the other UEs currently using the D2D link that the UE is the relay node via the PC5 interface, the processor is further configured to: notify the other UEs currently using the D2D link that the UE is the relay node through a RRC message via the PC5 interface, the RRC message carrying a relay indicator and an identifier of the UE; or notify the other UEs currently using the D2D link that the UE is the relay node through an MIB-SL message via the PC5 interface, the MIB-SL message carrying the relay indicator and the identifier of the UE.

In a possible embodiment of the present disclosure, subsequent to notifying the other UEs currently using the D2D link that the UE is the relay node via the PC5 interface, the processor is further configured to: in the case that its own running state does not meet the predetermined condition in accordance with the measurement result, notify the other UEs currently using the D2D link that the UE is not the relay node via the PC5 interface; and periodically measure its own running state.

In a possible embodiment of the present disclosure, the processor is further configured to: receive through the transceiver a relay discovery message from a remote UE within a predetermined range, the relay discovery message carrying target relay indicators and/or relay node identifiers; and in the case that its own identifier successfully matches any target relay indicator and/or relay node identifier in accordance with the relay discovery message, transmit through the transceiver a relay discovery response message to the remote UE, to indicate the remote UE to establish the D2D communication.

Bus architecture may include a number of buses and bridges connected to each other, to connect various circuits for one or more processors and one or more memories. In addition, as is known in the art, the bus architecture may be used to connect any other circuits, such as a circuit for a peripheral device, a circuit for a voltage stabilizer and a power management circuit. Bus interfaces are provided, and the transceiver may consist of a plurality of elements, i.e., a transmitter and a receiver for communication with any other devices over a transmission medium. With respect to different UEs, a user interface may also be provided for devices which are to be arranged inside or outside the UE, and these devices may include but not limited to a keypad, a display, a speaker, a microphone and a joystick.

In still yet another aspect, the present disclosure provides in some embodiments a UE, including a processor, a memory and a transceiver. The processor is configured to read a program stored in the memory, to: receive through the transceiver notification messages from other UEs within a predetermined range, the notification message being transmitted in the case that the other UE has determined that its own running state meets a predetermined condition, the running state being configured to at least describe a privilege or a running environment or a processing ability of any of the other UEs; and determine whether or not any of the other UEs is the relay node in accordance with the notification message. The transceiver is configured to receive and transmit data under the control of the processor. The processor takes charge of managing the bus architecture as well as general processings. The memory is configured to store therein data for the operation of the processor.

According to the device in the embodiments of the present disclosure, it is able to quickly use the relay node for the data transmission during the D2D discovery or D2D communication, thereby to improve the D2D discovery or D2D communication efficiency.

In a possible embodiment of the present disclosure, in the case of determining whether or not any of the other UEs is the relay node in accordance with the notification message, the processor is further configured to: acquire a notification message from any of the other UEs, and in the case that a relay indicator carried in the notification message from any other the other UEs indicates a relay activation state, determine the any of the other UEs as the relay node, the notification message carrying a relay activation indicator and/or an identifier of the UE; or acquire a notification message from any of the other UEs, and in the case that a relay indicator carried in the notification message from any of the other UEs indicates a relay deactivation state, determine the any of the other UEs as the relay node, the notification message carrying a relay activation indicator and/or an identifier of the UE.

In a possible embodiment of the present disclosure, the processor is further configured to: broadcast through the transceiver a relay discovery message via a PC5 interface, the relay discovery message carrying a relay indicator and/or an identifier of the UE; and upon the receipt of a relay discovery response message returned by the other relay node with respect to the relay discovery message, initiate through the transceiver the establishment of the D2D communication through the other relay node.

In a possible embodiment of the present disclosure, the processor is further configured to: in the case that the UE needs to perform D2D connection with another remote UE, initiate the establishment of the D2D communication through the relay node; or in the case that the UE needs to perform D2N connection with a network side device, initiate the establishment of the D2N communication through the relay node.

Bus architecture may include a number of buses and bridges connected to each other, to connect various circuits for one or more processors and one or more memories. In addition, as is known in the art, the bus architecture may be used to connect any other circuits, such as a circuit for a peripheral device, a circuit for a voltage stabilizer and a power management circuit. Bus interfaces are provided, and the transceiver may consist of a plurality of elements, i.e., a transmitter and a receiver for communication with any other devices over a transmission medium. With respect to different UEs, a user interface may also be provided for devices which are to be arranged inside or outside the UE, and these devices may include but not limited to a keypad, a display, a speaker, a microphone and a joystick.

In still yet another aspect, the present disclosure provides in some embodiments a UE, including a processor, a memory and a transceiver. The processor is configured to read a program stored in the memory, to: receive through the transceiver, a relay discovery message from a remote UE within a predetermined range, the relay discovery message carrying target relay indicators and/or relay node identifiers; and in the case that its own identifier successfully matches any target relay indicator and/or relay node identifier in accordance with the relay discovery message, transmit a relay discovery response message to the remote UE, to indicate the remote UE to perform the D2D communication. The transceiver is configured to receive and transmit data under the control of the processor. The processor takes charge of managing the bus architecture as well as general processings. The memory is configured to store therein data for the operation of the processor.

According to the UE in the embodiments of the present disclosure, it is able to quickly use the relay node for the data transmission during the D2D discovery or D2D communication, thereby to improve the D2D discovery or D2D communication efficiency.

Bus architecture may include a number of buses and bridges connected to each other, to connect various circuits for one or more processors and one or more memories. In addition, as is known in the art, the bus architecture may be used to connect any other circuits, such as a circuit for a peripheral device, a circuit for a voltage stabilizer and a power management circuit. Bus interfaces are provided, and the transceiver may consist of a plurality of elements, i.e., a transmitter and a receiver for communication with any other devices over a transmission medium. With respect to different UEs, a user interface may also be provided for devices which are to be arranged inside or outside the UE, and these devices may include but not limited to a keypad, a display, a speaker, a microphone and a joystick.

In still yet another aspect, the present disclosure provides in some embodiments a UE, including a processor, a memory and a transceiver. The processor is configured to read a program stored in the memory, to: broadcast through the transceiver a relay discovery message via a PC5 interface, the relay discovery message carrying a relay indicator and/or an identifier of the UE; and upon the receipt of a relay discovery response message returned by a relay node with respect to the relay discovery message, initiate the establishment of the D2D communication through the other relay node. The transceiver is configured to receive and transmit data under the control of the processor. The processor takes charge of managing the bus architecture as well as general processings. The memory is configured to store therein data for the operation of the processor.

According to the UE in the embodiments of the present disclosure, it is able to rapidly discover and use the relay node for the data transmission during the D2D discovery or D2D communication, thereby to improve the D2D discovery or D2D communication efficiency.

In a possible embodiment of the present disclosure, in the case of broadcasting through the transceiver the relay discovery message via the PC5 interface, the processor is further configured to: broadcast the relay discovery message to other UEs currently using a D2D link through a RRC message via the PC5 interface; or broadcast the relay discovery message to the other UEs currently using the D2D link through an MIB-SL message via the PC5 interface.

In a possible embodiment of the present disclosure, the processor is further configured to: in the case that the UE needs to establish D2D connection with another remote UE, initiate the establishment of the D2D communication through the other relay node; or in the case that the UE needs to establish D2N connection with another remote UE, initiate the establishment of the D2N communication through the other relay node.

Bus architecture may include a number of buses and bridges connected to each other, to connect various circuits for one or more processors and one or more memories. In addition, as is known in the art, the bus architecture may be used to connect any other circuits, such as a circuit for a peripheral device, a circuit for a voltage stabilizer and a power management circuit. Bus interfaces are provided, and the transceiver may consist of a plurality of elements, i.e., a transmitter and a receiver for communication with any other devices over a transmission medium. With respect to different UEs, a user interface may also be provided for devices which are to be arranged inside or outside the UE, and these devices may include but not limited to a keypad, a display, a speaker, a microphone and a joystick.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In a D2D communication mechanism, in order to enable a remote UE to communicate with a network, an on-network UE may be selected, to forward data for the remote UE, and this scenario is called as a UE-to-Network relay scenario. In this scenario, the remote UE needs to find an available UE-to-Network relay node. However, there is no relevant solution in the related art. The present disclosure provides a Radio Access Network (RAN)-based mechanism, where a relay function of the UE-to-Network relay node may be dynamically activated or deactivated, to enable the remote UE to find an appropriate UE-to-Network relay node. This scheme is also applied to a UE-to-UE scenario, to enable the UE to find an appropriate UE-to-UE relay node, thereby to communicate with another remote UE.

To facilitate the description, two link types may be defined herein. As a first link type, a D2D link refers to a link for direct communication between UEs, i.e., Device-to-Device, and as a second link type, a D2N link refers to a link between a UE and a network node.

In addition, UEs that take part in D2D discovery/communication may include a D2D transmission UE, i.e., a UE for transmitting a D2D discovery or D2D communication message, and a D2D reception UE, i.e., a UE for receiving the D2D discovery or D2D communication message from the D2D transmission UE.

Figure 1:
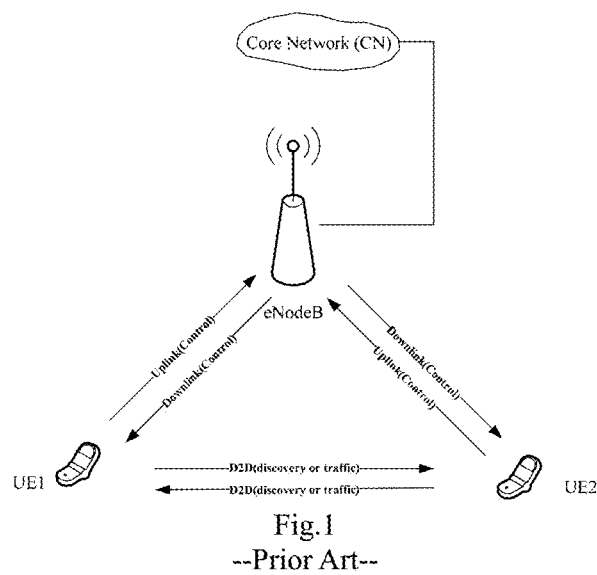
FIG. 1 is a schematic view showing D2D discovery and D2D communication in the related art.
Figure 2:
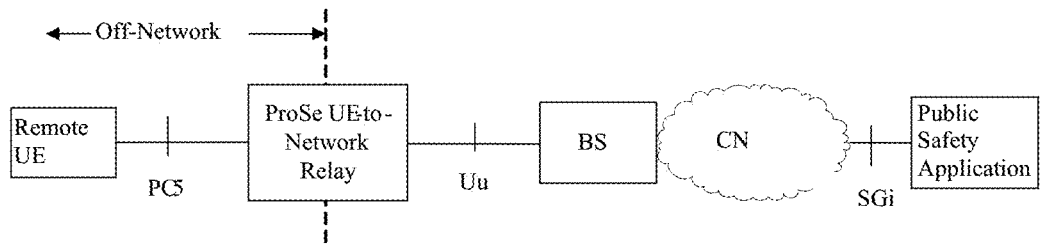
FIG. 2 is a schematic view showing the data transmission through a relay node for a UE-to-Network relay scenario in the related art.
Figure 3:
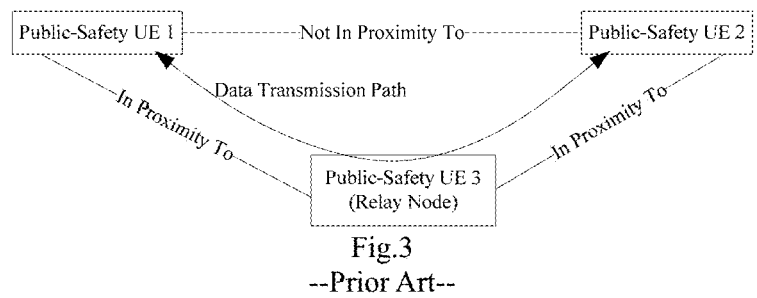
FIG. 3 is a schematic view showing the data transmission through the relay node between public-safety UEs not adjacent to each other in the related art.
Figure 4A:
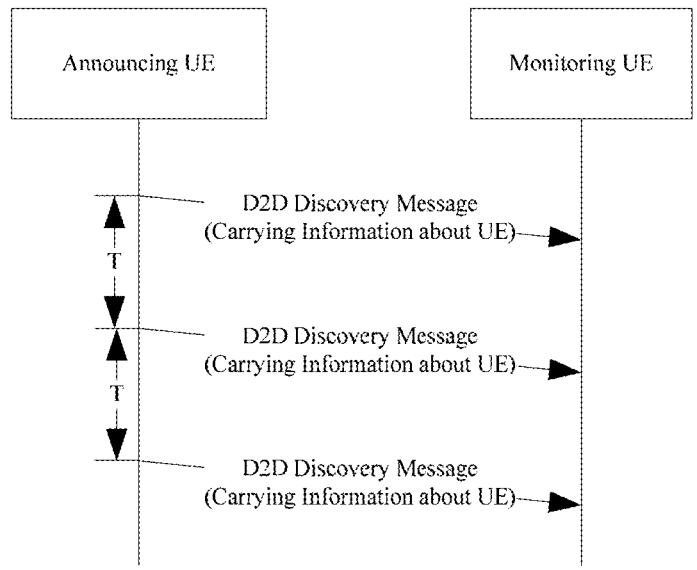
FIGS. 4A and 4B are schematic views showing two transmission models for a D2D direct discovery mechanism in the related art.
Figure 4B:
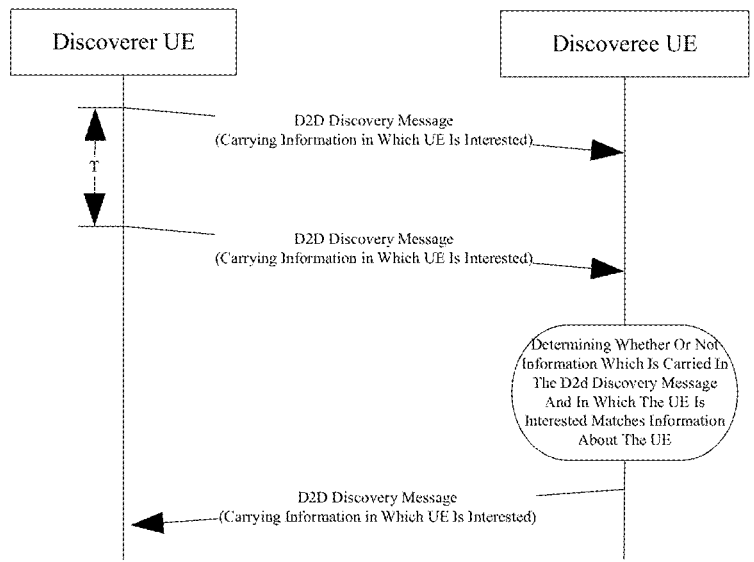

Currently, the 3GPP has presented two D2D discovery mechanisms, i.e., a direct discovery mechanism and an Evolved Packet Core network (EPC)-level discovery mechanism. A D2D discovery method in the embodiments of the present disclosure just utilizes the first D2D discovery mechanism, i.e., the transmission UE directly transits a D2D discovery signal via an air interface, and the adjacent reception UE directly performs the D2D discovery in accordance with the received D2D discovery signal. This procedure merely relates to a PC5 interface between the UEs, and there are two transmission models, i.e., Model A ("I am here"), as shown in FIG. 4A, and Model B ("Who is there"/"are you there"), as shown in FIG. 4B.

Figure 5:
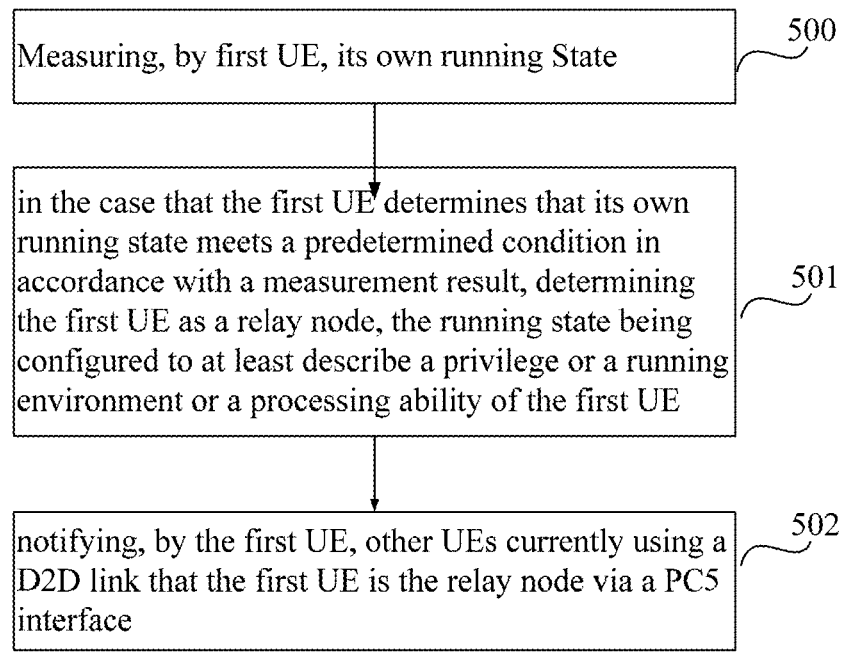
FIG. 5 is a flow chart of a method for determining a D2D relay node according to one embodiment of the present disclosure.

On the basis of Model A, referring to FIG. 5, the present disclosure provides in some embodiments a method for determining a D2D relay node, which includes the following steps.

Step 500: measuring, by a first UE, its own running state.

To be specific, Step 500 may include at least one of the following steps: acquiring, by the first UE, a network-side authentication result with respect to its own relay privilege; acquiring, by the first UE, a load of a current access network; acquiring, by the first UE, a signal quality measurement value of its own $U_U$ interface; acquiring, by the first UE, a current service handling capability of the first UE; acquiring, by the first UE, its own geographical position; acquiring, by the first UE, its own movement speed; and acquiring, by the first UE, a relay demand of for a current remote UE.

Step 501: in the case that the first UE determines that its own running state meets a predetermined condition in accordance with a measurement result, determining the first UE as a relay node, the running state being configured to at least describe a privilege or a running environment or a processing ability of the first UE.

To be specific, Step 501 may include at least one of the following steps: in the case that the first UE determines that the relay privilege is allowed to be used in accordance with the network-side authentication result with respect to its own relay privilege, determining the first UE as the relay node; in the case that the first UE determines that the load of the current access network is smaller than a predetermined threshold, determining the first UE as the relay node; in the case that the first UE determines that the signal quality measurement value of its own $U_U$ interface is greater than a predetermined threshold, determining the first UE as the relay node; in the case that the first UE determines that the current service handling capability of the first UE is greater than a predetermined threshold, determining the first UE as the relay node; in the case that the first UE determines that the first UE is located at a cell edge, determining the first UE as the relay node; in the case that the first UE determines that its own movement speed is smaller than a predetermined threshold, determining the first UE as the relay node; and in the case that the first UE determines that the relay demand of the current remote UE is greater than a predetermined threshold, determining the first UE as the relay node.

Step 502: notifying, by the first UE, other UEs currently using a D2D link that the first UE is the relay node via a PC5 interface.

To be specific, Step 502 may include the following two circumstances.

In a first circumstance, the first UE may notify the other UEs currently using the D2D link that the first UE is the relay node through a RRC message via the PC5 interface, and the RRC message may carry a relay indicator and/or an identifier (ID) of the first UE. For example, the first UE may determine, in accordance with such factors as the network-side authentication result, the network load condition, its own service handling capability, the signal quality of the $U_U$ interface and the geographical position of the first UE in the case of accessing to a network, that the first UE is the relay node. In the case that the first UE decides to activate its relay function, a new RRC message transmitted via the PC5 interface may carry information about a relay indicator and a relay ID. The relay indicator "1" represents a relay activation state.

In a second circumstance, the first UE may notify the other UEs currently using the D2D link that the first UE is the relay node through an MIB-SL message via the PC5 interface, and the MIB-SL message may carry the relay indicator and the identifier of the first UE.

Figure 6A:
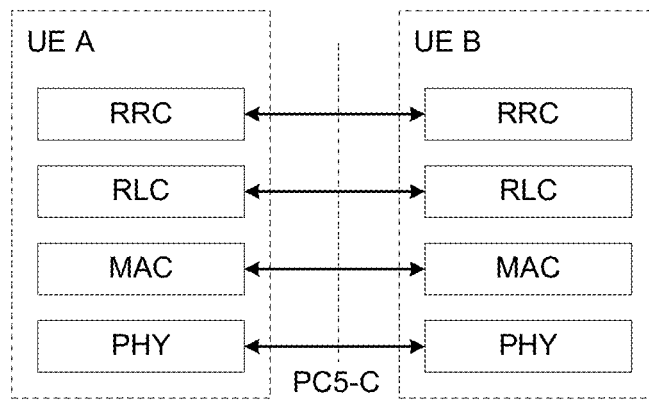
FIG. 6A is a schematic view showing a protocol stack for a control plane of a PC5 interface.

FIG. 6A shows a protocol stack for a control plane of the PC5 interface, which includes a RRC layer, a Radio Link Control (RLC) layer, a Medium Access Control (MAC) layer and a Physical Layer (PHY). In the embodiments of the present disclosure the data interaction between the UEs is performed at the RRC layer, to achieve the data transmission in a more rapid and reliable manner.

For example, the first UE may determine, in accordance with such factors as the network-side authentication result, the network load condition, its own service handling capability, the signal quality of the $U_U$ interface and the geographical position of the first UE in the case of accessing to the network, that the first UE is the relay node, and decide to activate the relay function. At this time, reserved bits in the MIB-SL message to be transmitted via the PC5 interface may be used to achieve the function. The MIB-SL message may carry information about a relay indicator and a relay ID. The relay indicator may be a Boolen value, and in the case that the relay indicator is "1", it means that the relay function is to be activated.

Further, after the first UE has notified the other UEs currently using the D2D link that the first UE is the relay node via the PC5 interface, in the case that the first UE determines that its own running state does not meet the predetermined condition in accordance with the measurement result, the first UE may notify the other UEs currently using the D2D link that the first UE is not the relay node via the PC5 interface. It should be appreciated that, after a relay deactivation operation, the first UE needs to continue to periodically measure its own running state.

Figure 6B:
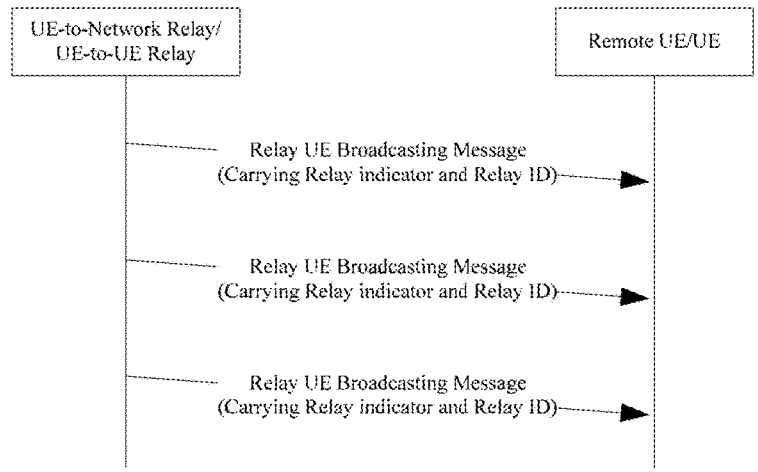
FIG. 6B is a schematic view showing a deactivation procedure of the D2D relay node according to one embodiment of the present disclosure.

For example, the relay node may decide, in accordance with such factors as the network-side authentication result, the network load condition, its own service handling capability, the signal quality of the $U_U$ interface and the geographical position of the first UE in the case of accessing to the network, to deactivate the relay function. To be specific, in the case that a new service request cannot be admitted in accordance with the network load condition, or in the case that the number of the remote UEs capable of being supported by the relay node reaches an upper limit, or in the case that the $U_U$ interface has insufficient signal quality, or in the case that the UE is located in the middle of a cell or in the case that the UE moves too fast, the relay node may decide to deactivate its relay function, and broadcast information about its relay capability. At this time, the new RRC message to be transmitted via the PC5 interface may carry information about the relay indicator and the relay ID. In a possible embodiment of the present disclosure, the reserved bits in the MIB-SL message to be transmitted via the PC5 interface may be also used. The relay indicator may be a Boolen value, and in the case that the relay indicator is "0", it means that the relay function is to be deactivated, as shown in FIG. 6B. The MSB-SL message may have the following format. Upon the receipt of the information, the remote node may select and access to the other relay node.

| MasterInformationBlock-SL | |
|---|---|
| -- ASN1START | |
| MasterInformationBlock-SL ::= | SEQUENCE { |
| sl-Bandwidth-r12 | ENUMERATED { |
| | n6, n15, n25, n50, n75, n100}, |
| tdd-ConfigSL-r12 | TDD-ConfigSL-r12, |
| directFrameNumber-r12 | BIT STRING (SIZE (10)), |
| directSubframeNumber-r12 | INTEGER (0..9), |
| inCoverage-r12 | BOOLEAN, |
| reserved-r12 | BIT STRING (SIZE (19)) |
| } | |
| -- ASN1STOP | |

Further, the first UE may receive a relay discovery message from a remote UE within a predetermined range, and the relay discovery message may carry target relay indicators and/or relay node identifiers. In the case that the first UE determines in accordance with the relay discovery message that its own identifier successfully matches any target relay indicator and/or relay node identifier, the first UE may transmit a relay discovery response message to the remote UE, to indicate the remote UE to establish the D2D communication.

Figure 7:
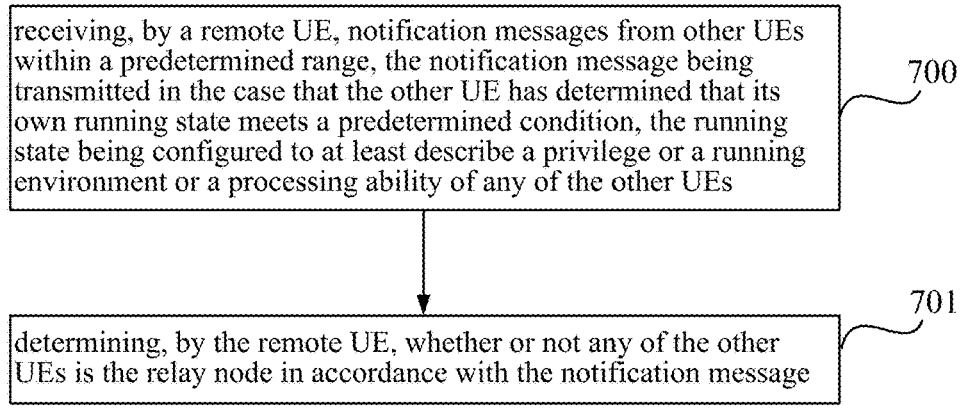
FIG. 7 is a flow chart of a method for using a D2D relay node according to one embodiment of the present disclosure.

Referring to FIG. 7, the present disclosure further provides in some embodiments a method for using a D2D relay node, which includes: Step 700 of receiving, by a remote UE, notification messages from other UEs within a predetermined range, the notification message being transmitted in the case that the other UE has determined that its own running state meets a predetermined condition, the running state being configured to at least describe a privilege or a running environment or a processing ability of any of the other UEs; and Step 701 of determining, by the remote UE, whether or not any of the other UEs is the relay node in accordance with the notification message.

The remote UE may determine whether or not any of the other UEs is the relay node in accordance with the notification message. To be specific, the remote UE may acquire a notification message from any of the other UEs, and in the case that a relay indicator carried in the notification message from any other the other UEs indicates a relay activation state, determine the any of the other UEs as the relay node, the notification message carrying the relay indicator and/or an identifier of the UE; or acquire a notification message from any of the other UEs, and in the case that a relay indicator carried in the notification message from any of the other UEs indicates a relay deactivation state, determine the any of the other UEs as the relay node, the notification message carrying the relay activation indicator and/or an identifier of the UE.

Further, the remote UE may broadcast a relay discovery message via a PC5 interface, the relay discovery message carrying target relay indicators and/or relay node identifiers of the remote UE; and upon the receipt of a relay discovery response message returned by the other relay node with respect to the relay discovery message, initiate the establishment of the D2D or D2N communication through the other relay node.

Furthermore, in the case that the remote UE needs to perform the D2D connection with another remote UE, the remote UE may initiate the establishment of the D2D communication through the relay node; or in the case that the remote UE needs to perform D2N connection with a network side device, remote UE may initiate the establishment of the D2N communication through the relay node.

Figure 8:
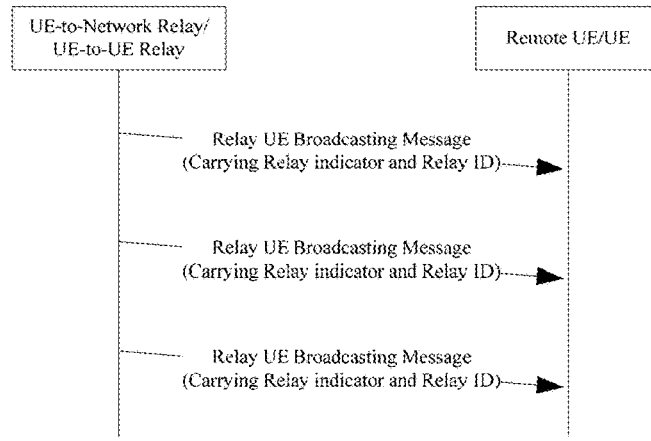
FIGS. 8 and 11 are schematic views showing two transmission models for a D2D direct discovery mechanism according to one embodiment of the present disclosure.

Based on the above-mentioned method, the UE-to-Network relay node or the UE-to-UE relay node may activate the relay function, and the Model A ("I am here") is shown in FIG. 8.

The relay node may decide to activate the relay function in accordance with such factors as the network-side authentication result, the network load condition, its own service handling capability, the signal quality of the $U_U$ interface and the geographical position of the UE in the case of accessing to the network.

For example, in the case that the network-side authentication result of a certain UE is true, or in the case that a new service request can be admitted in accordance with the network load condition, or in the case that the number of the remote UEs initiating a relay request does not reach an upper limit, or in the case that the $U_U$ interface has insufficient signal quality or in the case that the UE is located at a cell edge, the UE may determine it as the relay node, and decide to activate its relay function and broadcast information about its relay capability. At this time, a new RRC message to be transmitted via the PC5 interface may carry information about the relay indicator and the relay ID. In a possible embodiment of the present disclosure, reserved bits in the MIB-SL message to be transmitted via the PC5 interface may be also used. The relay indicator may be a Boolen value, and in the case that the relay indicator is "1", it means that the relay function is to be activated. The MSB-SL message may have the following format.

| MasterInformationBlock-SL | |
|---|---|
| -- ASN1START | |
| MasterInformationBlock-SL ::= | SEQUENCE { |
| sl-Bandwidth-r12 | ENUMERATED { |
| | n6, n15, n25, n50, n75, n100}, |
| tdd-ConfigSL-r12 | TDD-ConfigSL-r12, |
| directFrameNumber-r12 | BIT STRING (SIZE (10)), |
| directSubframeNumber-r12 | INTEGER (0..9), |
| inCoverage-r12 | BOOLEAN, |
| reserved-r12 | BIT STRING (SIZE (19)) |
| } | |
| -- ASN1 STOP | |

The remote UE may receive the MIB-SL message or a new RRC message from the adjacent relay node, and determine whether or not the D2D UE has a relay capability in accordance with the contents carried in the MIB-SL message or the new RRC message. In the case that the D2D UE has the relay capability, the remote UE may initiate to the relay node the subsequent establishment of the communication, e.g., the establishment of one-to-one communication or the allocation of Internet Protocol (IP) addresses.

Figure 9:
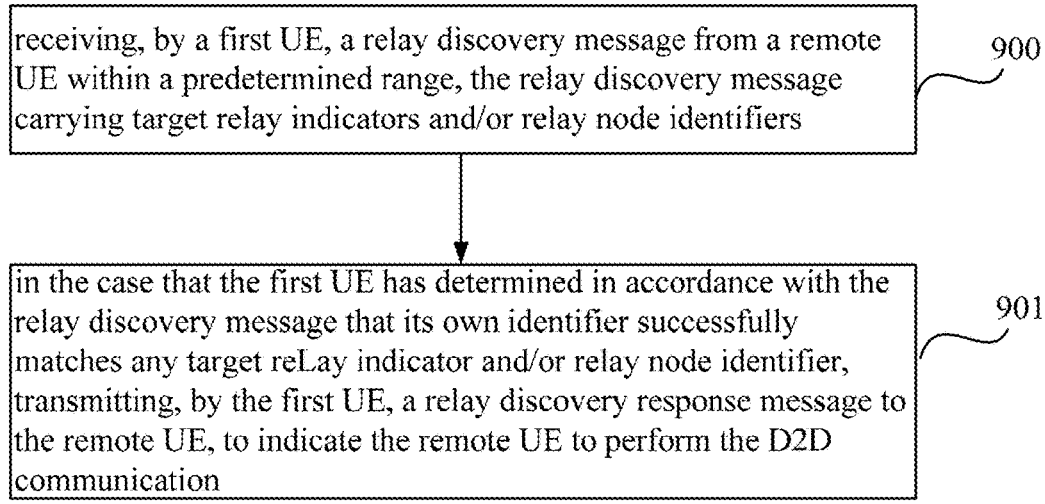
FIG. 9 is a flow chart of a method for determining a D2D relay node according to one embodiment of the present disclosure.

Based on Model B, referring to FIG. 9, the present disclosure further provides in some embodiments a method for determining a D2D relay node, which includes: Step 900 of receiving, by a first UE, a relay discovery message from a remote UE within a predetermined range, the relay discovery message carrying target relay indicators and/or relay node identifiers; and Step 901 of, in the case that the first UE has determined in accordance with the relay discovery message that its own identifier successfully matches any target relay indicator and/or relay node identifier, transmitting, by the first UE, a relay discovery response message to the remote UE, to indicate the remote UE to perform the D2D communication.

Figure 10:
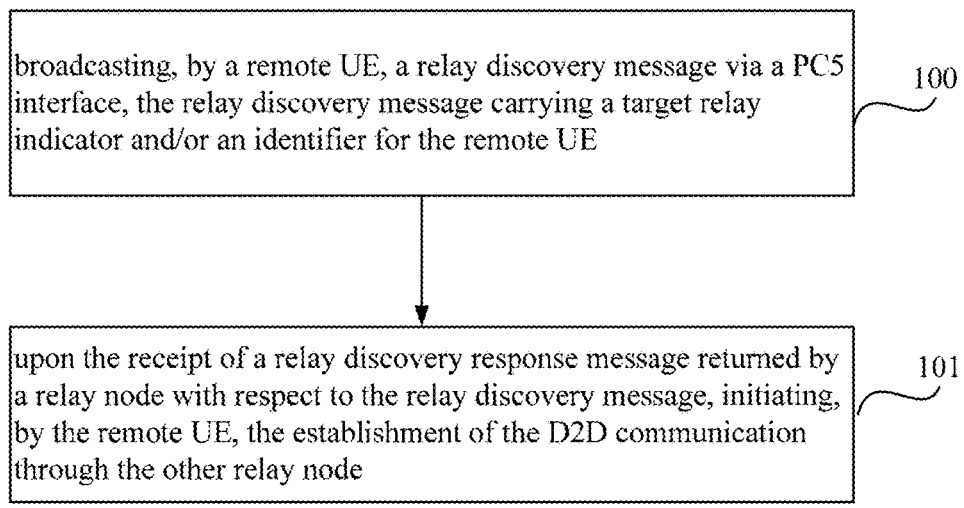
FIG. 10 is a flow chart of a method for using a D2D relay node according to one embodiment of the present disclosure.

Referring to FIG. 10, the present disclosure further provides in some embodiments a method for using a D2D relay node, which includes: Step 100 of broadcasting, by a remote UE, a relay discovery message via a PC5 interface, the relay discovery message carrying target relay indicators and/or relay node identifiers of the remote UE; and Step 101 of, upon the receipt of a relay discovery response message returned by a relay node with respect to the relay discovery message, initiating, by the remote UE, the establishment of the D2D communication through the relay node.

To be specific, Step 100 may include: broadcasting, by the remote UE, the relay discovery message to other UEs currently using a D2D link through a RRC message via the PC5 interface; or broadcasting, by the remote UE, the relay discovery message to the other UEs currently using the D2D link through an MIB-SL message via the PC5 interface.

Further, in the case that the remote UE needs to establish D2D connection with another remote UE, the remote UE may initiate the establishment of the D2D communication through the other relay node; or in the case that the remote UE needs to establish D2N connection with the network side device, the remote UE may initiate the establishment of the D2N communication through the relay node.

Figure 11:
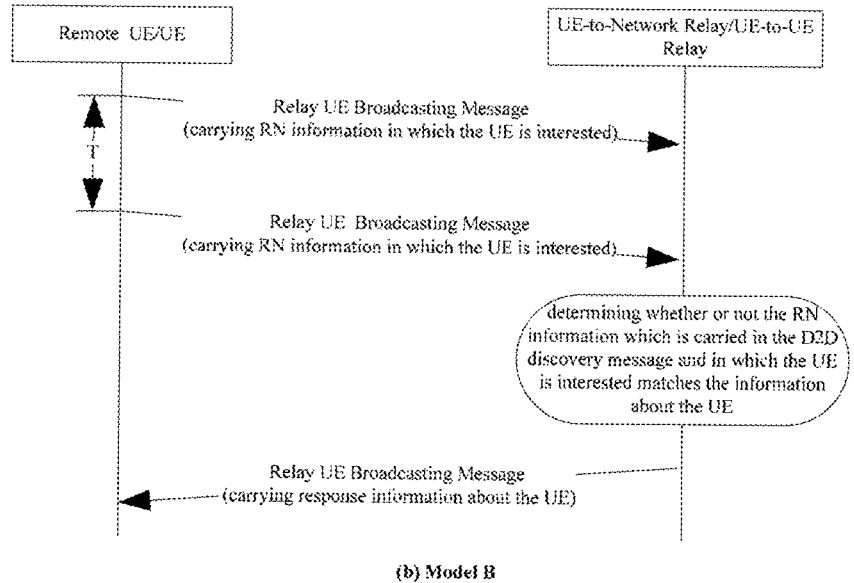

Based on the above-mentioned method, the UE-to-Network relay node or the UE-to-UE relay node may activate its relay function, and Model B ("Who is there"/"are you there") may refer to FIG. 11.

Step 1: the remote UE may broadcast the relay discovery message in a new RRC message or MIB-SL message to be transmitted through the PC5 interface, and the relay discovery message may carry information about a relay indicator or a relay ID in which the remote UE is interested.

Step 2: the relay node may receive the relay discovery message from the adjacent remote UE, and determine, in accordance with the contents carried in the relay discovery message, whether or not to broadcast the relay discovery response message to the remote UE.

For example, the relay discovery message broadcast by a certain remote UE, e.g., UE 1, may carry the information about a relay indicator ("1") and a plurality of relay IDs in which the remote UE is interested, and a certain relay node, e.g., UE 2, may receive the relay discovery message and match its own ID with the plurality of relay IDs carried in the relay discovery message. In the case that they are matched successfully, the UE 2 may transmit the relay discovery response message to the UE 1. In the case that the relay discovery message broadcast by a certain remote UE, e.g., UE 3, merely carries the relay indicator ("1") in which the remote UE is interested, after another relay node, e.g., the UE 2, has received the relay discovery message, the UE 2 may transmit the relay discovery response message to the UE 1.

Further, upon the receipt of the relay discovery response message from the relay UE, the remote UE may initiate the subsequent establishment of communication through the relay node, e.g., the establishment of one-to-one communication, or the allocation of IP addresses.

Figure 12:
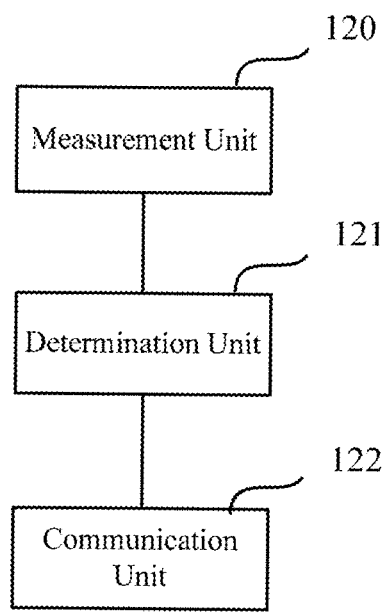
FIG. 12 is a schematic view showing a UE for determining a D2D relay node according to one embodiment of the present disclosure.

Referring to FIG. 12, the present disclosure provides in some embodiments a UE for determining a D2D relay node, which includes: a measurement unit 120 configured to measure its own running state; a determination unit 121 configured to, in the case that it is determined that its own running state meets a predetermined condition in accordance with a measurement result, determine the UE as a relay node, the running state being configured to at least describe a privilege or a running environment or a processing ability of the UE; and a notification unit 122 configured to notify other UEs currently using a D2D link that the UE is the relay node via a PC5 interface.

According to the UE in the embodiments of the present disclosure, it is able to quickly determine the relay node for the data transmission during the D2D discovery or D2D communication, thereby to improve the D2D discovery or D2D communication efficiency.

In a possible embodiment of the present disclosure, in the case of measuring its own running state, the measurement unit 120 is further configured to acquire at least one of: a network-side authentication result with respect to its own relay privilege; a load of a current access network; a signal quality measurement value of its own $U_U$ interface; a current service handling capability of the UE; its own geographical position; its own movement speed; and a relay demand of for a current remote UE.

In a possible embodiment of the present disclosure, in the case of determining the UE as the relay node, the determination unit 121 is further configured to perform at least one of the following operations: in the case that the relay privilege is allowed to be used in accordance with the network-side authentication result with respect to its own relay privilege, determine the UE as the relay node; in the case that the load of the current access network is smaller than a predetermined threshold, determine the UE as the relay node; in the case that the signal quality measurement value of its own $U_U$ interface is greater than a predetermined threshold, determine the UE as the relay node; in the case that the current service handling capability of the first UE is greater than a predetermined threshold, determine the UE as the relay node; in the case that the first UE is located at a cell edge, determine the UE as the relay node; in the case that its own movement speed is smaller than a predetermined threshold, determine the UE as the relay node; and in the case that the relay demand of the current remote UE is greater than a predetermined threshold, determine the UE as the relay node.

In a possible embodiment of the present disclosure, in the case of notifying the other UEs currently using the D2D link that the UE is the relay node via the PC5 interface, the notification unit 122 is further configured to: notify the other UEs currently using the D2D link that the UE is the relay node through a RRC message via the PC5 interface, the RRC message carrying a relay indicator and an identifier of the UE; or notify the other UEs currently using the D2D link that the UE is the relay node through an MIB-SL message via the PC5 interface, the MIB-SL message carrying the relay indicator and the identifier of the UE.

In a possible embodiment of the present disclosure, subsequent to notifying the other UEs currently using the D2D link that the UE is the relay node via the PC5 interface, the notification unit 122 is further configured to, in the case that its own running state does not meet the predetermined condition in accordance with the measurement result, notify the other UEs currently using the D2D link that the UE is not the relay node via the PC5 interface, and the measurement unit 120 is further configured to periodically measure its own running state.

In a possible embodiment of the present disclosure, the notification unit 122 is further configured to: receive a relay discovery message from a remote UE within a predetermined range, the relay discovery message carrying target relay indicators and/or relay node identifiers; and in the case that its own identifier successfully matches any target relay indicator and/or relay node identifier in accordance with the relay discovery message, transmit a relay discovery response message to the remote UE, to indicate the remote UE to establish the D2D communication.

Figure 13:
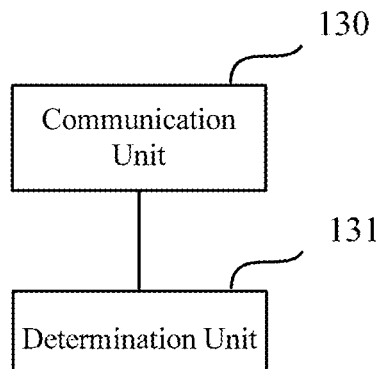
FIG. 13 is a schematic view sowing a UE for using a D2D relay node according to one embodiment of the present disclosure.

Referring to FIG. 13, the present disclosure provides in some embodiments a UE for using a D2D relay node, which includes: a communication unit 130 configured to receive notification messages from other UEs within a predetermined range, the notification message being transmitted in the case that the other UE has determined that its own running state meets a predetermined condition, the running state being configured to at least describe a privilege or a running environment or a processing ability of any of the other UEs; and a determination unit 131 configured to determine whether or not any of the other UEs is the relay node in accordance with the notification message.

According to the device in the embodiments of the present disclosure, it is able to quickly use the relay node for the data transmission during the D2D discovery or D2D communication, thereby to improve the D2D discovery or D2D communication efficiency.

In a possible embodiment of the present disclosure, in the case of determining whether or not any of the other UEs is the relay node in accordance with the notification message, the determination unit 131 is further configured to: acquire a notification message from any of the other UEs, and in the case that a relay indicator carried in the notification message from any other the other UEs indicates a relay activation state, determine the any of the other UEs as the relay node, the notification message carrying a relay activation indicator and/or an identifier of the UE; or acquire a notification message from any of the other UEs, and in the case that a relay indicator carried in the notification message from any of the other UEs indicates a relay deactivation state, determine the any of the other UEs as the relay node, the notification message carrying a relay activation indicator and/or an identifier of the UE.

In a possible embodiment of the present disclosure, the communication unit 130 is further configured to: broadcast a relay discovery message via a PC5 interface, the relay discovery message carrying a target relay indicator and/or a relay node identifier for the remote UE; and upon the receipt of a relay discovery response message returned by the other relay node with respect to the relay discovery message, initiate the establishment of the D2D communication through the other relay node.

In a possible embodiment of the present disclosure, the communication unit 130 is further configured to: in the case that the UE needs to perform D2D connection with another remote UE, initiate the establishment of the D2D communication through the relay node; or in the case that the UE needs to perform D2N connection with a network side device, initiate the establishment of the D2N communication through the relay node.

Figure 14:
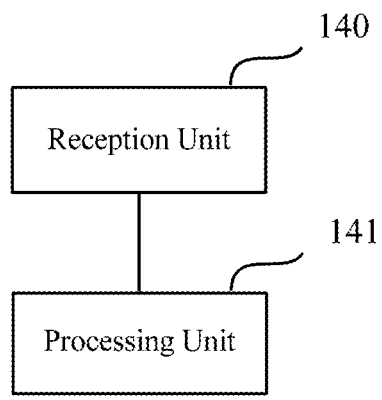
FIG. 14 is a schematic view showing a UE for determining a D2D relay node according to one embodiment of the present disclosure.

Referring to FIG. 14, the present disclosure provides in some embodiments a UE for determining a D2D relay node, which includes: a reception unit 140 configured to receive a relay discovery message from a remote UE within a predetermined range, the relay discovery message carrying target relay indicators and/or relay node identifiers; and a processing unit 141 configured to, in the case that its own identifier successfully matches any target relay indicator and/or relay node identifier in accordance with the relay discovery message, transmit a relay discovery response message to the remote UE, to indicate the remote UE to perform the D2D communication.

According to the UE in the embodiments of the present disclosure, it is able to quickly use the relay node for the data transmission during the D2D discovery or D2D communication, thereby to improve the D2D discovery or D2D communication efficiency.

Figure 15:
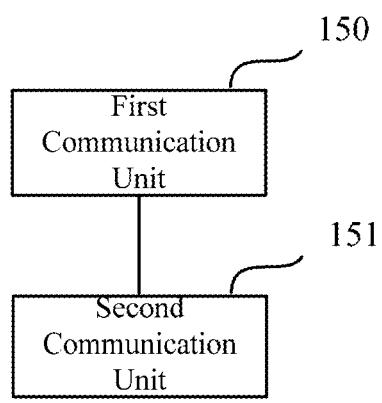
FIG. 15 is a schematic view showing a UE for using a D2D relay node according to one embodiment of the present disclosure.

Referring to FIG. 15, the present disclosure provides in some embodiments a UE for using a D2D relay node, which includes: a first communication unit 150 configured to broadcast a relay discovery message via a PC5 interface, the relay discovery message carrying a target relay indicator and/or a relay node identifier for the remote UE; and a second communication unit 151 configured to, upon the receipt of a relay discovery response message returned by a relay node with respect to the relay discovery message, initiate the establishment of the D2D communication through the relay node.

According to the UE in the embodiments of the present disclosure, it is able to rapidly discover and use the relay node for the data transmission during the D2D discovery or D2D communication, thereby to improve the D2D discovery or D2D communication efficiency.

In a possible embodiment of the present disclosure, in the case of broadcasting the relay discovery message via the PC5 interface, the first communication unit 150 is further configured to: broadcast the relay discovery message to other UEs currently using a D2D link through a RRC message via the PC5 interface; or broadcast the relay discovery message to the other UEs currently using the D2D link through an MIB-SL message via the PC5 interface.

In a possible embodiment of the present disclosure, the second communication unit 151 is further configured to: in the case that the UE needs to establish D2D connection with another remote UE, initiate the establishment of the D2D communication through the relay node; or in the case that the UE needs to establish D2N connection with another remote UE, initiate the establishment of the D2N communication through the relay node.

Figure 16:
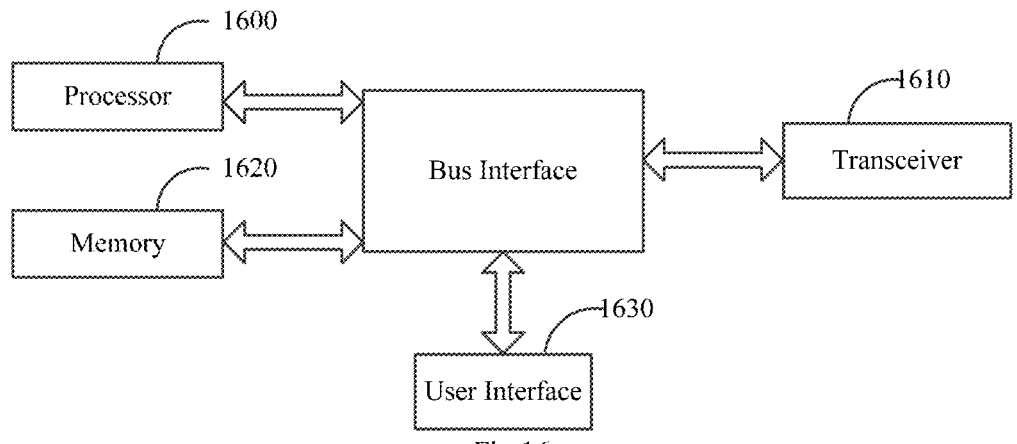
FIG. 16 is a schematic view showing a UE for determining a D2D relay node according to one embodiment of the present disclosure.

Referring to FIG. 16, the present disclosure further provides in some embodiments a UE, which includes a processor 1600, a memory 1620 and a transceiver 1610. The processor 1600 is configured to read a program stored in the memory 1620, to: measure its own running state; in the case that its own running state meets a predetermined condition in accordance with a measurement result, determine the UE as a relay node, the running state being configured to at least describe a privilege or a running environment or a processing ability of the UE; and notify through the transceiver 1610 other UEs currently using a D2D link that the UE is the relay node via a PC5 interface.

According to the UE in the embodiments of the present disclosure, it is able to quickly determine the relay node for the data transmission during the D2D discovery or D2D communication, thereby to improve the D2D discovery or D2D communication efficiency.

In a possible embodiment of the present disclosure, in the case of measuring its own running state, the processor 1600 is further configured to acquire at least one of: a network-side authentication result with respect to its own relay privilege; a load of a current access network; a signal quality measurement value of its own $U_U$ interface; a current service handling capability of the UE; its own geographical position; its own movement speed; and a relay demand of for a current remote UE.

In a possible embodiment of the present disclosure, in the case of determining the UE as the relay node, the processor 1600 is further configured to perform at least one of the following operations: in the case that the relay privilege is allowed to be used in accordance with the network-side authentication result with respect to its own relay privilege, determine the UE as the relay node; in the case that the load of the current access network is smaller than a predetermined threshold, determine the UE as the relay node; in the case that the signal quality measurement value of its own $U_U$ interface is greater than a predetermined threshold, determine the UE as the relay node; in the case that the current service handling capability of the first UE is greater than a predetermined threshold, determine the UE as the relay node; in the case that the first UE is located at a cell edge, determine the UE as the relay node; in the case that its own movement speed is smaller than a predetermined threshold, determine the UE as the relay node; and in the case that the relay demand of the current remote UE is greater than a predetermined threshold, determine the UE as the relay node.

In a possible embodiment of the present disclosure, the case of notifying through the transceiver 1610 the other UEs currently using the D2D link that the UE is the relay node via the PC5 interface, the processor 1600 is further configured to: notify the other UEs currently using the D2D link that the UE is the relay node through a RRC message via the PC5 interface, the RRC message carrying a relay indicator and an identifier of the UE; or notify the other UEs currently using the D2D link that the UE is the relay node through an MIB-SL message via the PC5 interface, the MIB-SL message carrying the relay indicator and the identifier of the UE.

In a possible embodiment of the present disclosure, subsequent to notifying the other UEs currently using the D2D link that the UE is the relay node via the PC5 interface, the processor 1600 is further configured to: in the case that its own running state does not meet the predetermined condition in accordance with the measurement result, notify the other UEs currently using the D2D link that the UE is not the relay node via the PC5 interface; and periodically measure its own running state.

In a possible embodiment of the present disclosure, the processor 1600 is further configured to: receive through the transceiver 1610 a relay discovery message from a remote UE within a predetermined range, the relay discovery message carrying target relay indicators and/or relay node identifiers; and in the case that its own identifier successfully matches any target relay indicator and/or relay node identifier in accordance with the relay discovery message, transmit through the transceiver 1610 a relay discovery response message to the remote UE, to indicate the remote UE to establish the D2D communication.

The transceiver 1610 is configured to receive and transmit data under the control of the processor 1600.

In FIG. 16, bus architecture may include a number of buses and bridges connected to each other, to connect various circuits for one or more processors 1600 and one or more memories 1620. In addition, as is known in the art, the bus architecture may be used to connect any other circuits, such as a circuit for a peripheral device, a circuit for a voltage stabilizer and a power management circuit. Bus interfaces are provided, and the transceiver 1610 may consist of a plurality of elements, i.e., a transmitter and a receiver for communication with any other devices over a transmission medium. With respect to different UEs, a user interface 1630 may also be provided for devices which are to be arranged inside or outside the UE, and these devices may include but not limited to a keypad, a display, a speaker, a microphone and a joystick.

Figure 17:
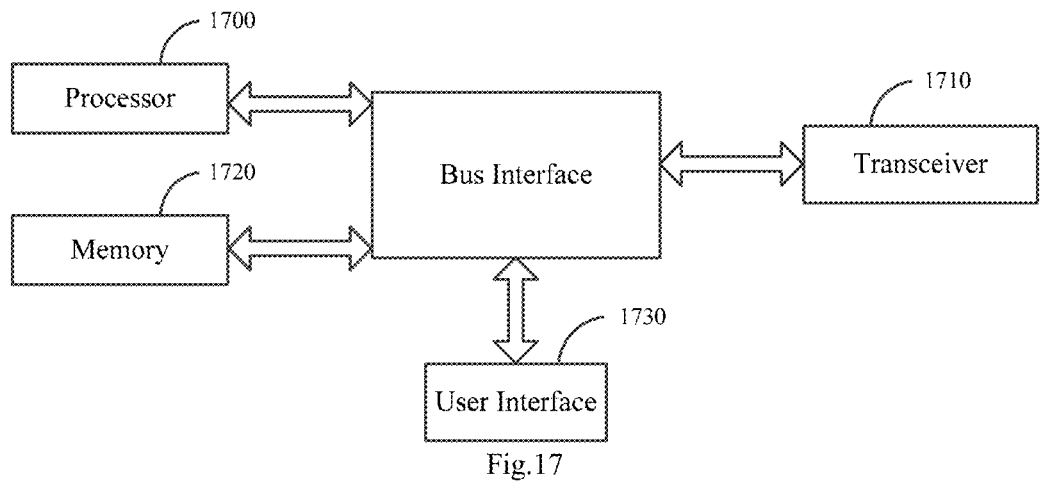
FIG. 17 is a schematic view showing a UE for using a D2D relay node according to one embodiment of the present disclosure.

Referring to FIG. 17, the present disclosure further provides in some embodiments a UE, which includes a processor 1700, a memory 1720, and a transceiver 1710.

The processor 1700 is configured to read a program stored in the memory 1720, to: receive through the transceiver 1710 notification messages from other UEs within a predetermined range, the notification message being transmitted in the case that the other UE has determined that its own running state meets a predetermined condition, the running state being configured to at least describe a privilege or a running environment or a processing ability of any of the other UEs; and determine whether or not any of the other UEs is the relay node in accordance with the notification message.

According to the device in the embodiments of the present disclosure, it is able to quickly use the relay node for the data transmission during the D2D discovery or D2D communication, thereby to improve the D2D discovery or D2D communication efficiency.

In a possible embodiment of the present disclosure, in the case of determining whether or not any of the other UEs is the relay node in accordance with the notification message, the processor 1700 is further configured to: acquire a notification message from any of the other UEs, and in the case that a relay indicator carried in the notification message from any other the other UEs indicates a relay activation state, determine the any of the other UEs as the relay node, the notification message carrying a relay activation indicator and/or an identifier of the UE; or acquire a notification message from any of the other UEs, and in the case that a relay indicator carried in the notification message from any of the other UEs indicates a relay deactivation state, determine the any of the other UEs as the relay node, the notification message carrying a relay deactivation indicator and/or an identifier of the UE.

In a possible embodiment of the present disclosure, the processor 1700 is further configured to: broadcast through the transceiver 1710 a relay discovery message via a PC5 interface, the relay discovery message carrying a target relay indicator and/or a relay node identifier for the remote UE; and upon the receipt of a relay discovery response message returned by the relay node with respect to the relay discovery message, initiate through the transceiver 1710 the establishment of the D2D communication through the relay node.

In a possible embodiment of the present disclosure, the processor 1700 is further configured to: in the case that the UE needs to perform D2D connection with another remote UE, initiate the establishment of the D2D communication through the relay node; or in the case that the UE needs to perform D2N connection with a network side device, initiate the establishment of the D2N communication through the relay node.

The transceiver 1710 is configured to receive and transmit data under the control of the processor 1700.

In FIG. 17, bus architecture may include a number of buses and bridges connected to each other, to connect various circuits for one or more processors 1700 and one or more memories 1720. In addition, as is known in the art, the bus architecture may be used to connect any other circuits, such as a circuit for a peripheral device, a circuit for a voltage stabilizer and a power management circuit. Bus interfaces are provided, and the transceiver 1710 may consist of a plurality of elements, i.e., a transmitter and a receiver for communication with any other devices over a transmission medium. With respect to different UEs, a user interface 1730 may also be provided for devices which are to be arranged inside or outside the UE, and these devices may include but not limited to a keypad, a display, a speaker, a microphone and a joystick. The processor 1700 takes charge of managing the bus architecture as well as general processings. The memory 1720 is configured to store therein data for the operation of the processor 1700.

Figure 18:
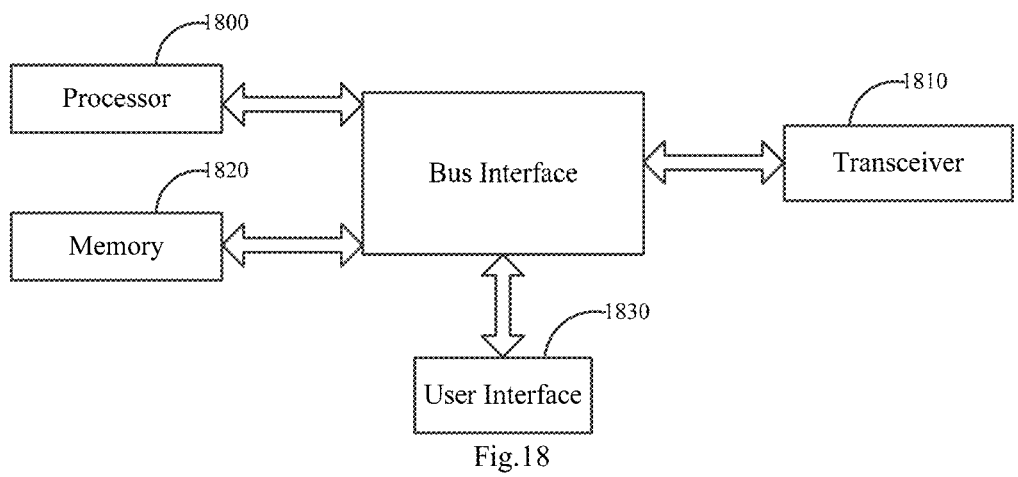
FIG. 18 is a schematic view showing a UE for determining a D2D relay node according to one embodiment of the present disclosure.

Referring to FIG. 18, the present disclosure further provides in some embodiments a UE, which includes a processor 1800, a memory 1820 and a transceiver 1810. The processor 1800 takes charge of managing the bus architecture as well as general processings. The memory 1820 is configured to store therein data for the operation of the processor 1800.

The processor 1800 is configured to read a program stored in the memory, to: receive through the transceiver 1810, a relay discovery message from a remote UE within a predetermined range, the relay discovery message carrying target relay indicators and/or relay node identifiers; and in the case that its own identifier successfully matches any target relay indicator and/or relay node identifier in accordance with the relay discovery message, transmit a relay discovery response message to the remote UE, to indicate the remote UE to perform the D2D communication.

According to the UE in the embodiments of the present disclosure, it is able to quickly use the relay node for the data transmission during the D2D discovery or D2D communication, thereby to improve the D2D discovery or D2D communication efficiency.

The transceiver 1810 is configured to receive and transmit data under the control of the processor 1800.

In FIG. 18, bus architecture may include a number of buses and bridges connected to each other, to connect various circuits for one or more processors 1800 and one or more memories 1820. In addition, as is known in the art, the bus architecture may be used to connect any other circuits, such as a circuit for a peripheral device, a circuit for a voltage stabilizer and a power management circuit. Bus interfaces are provided, and the transceiver 1810 may consist of a plurality of elements, i.e., a transmitter and a receiver for communication with any other devices over a transmission medium. With respect to different UEs, a user interface 1830 may also be provided for devices which are to be arranged inside or outside the UE, and these devices may include but not limited to a keypad, a display, a speaker, a microphone and a joystick.

Figure 19:
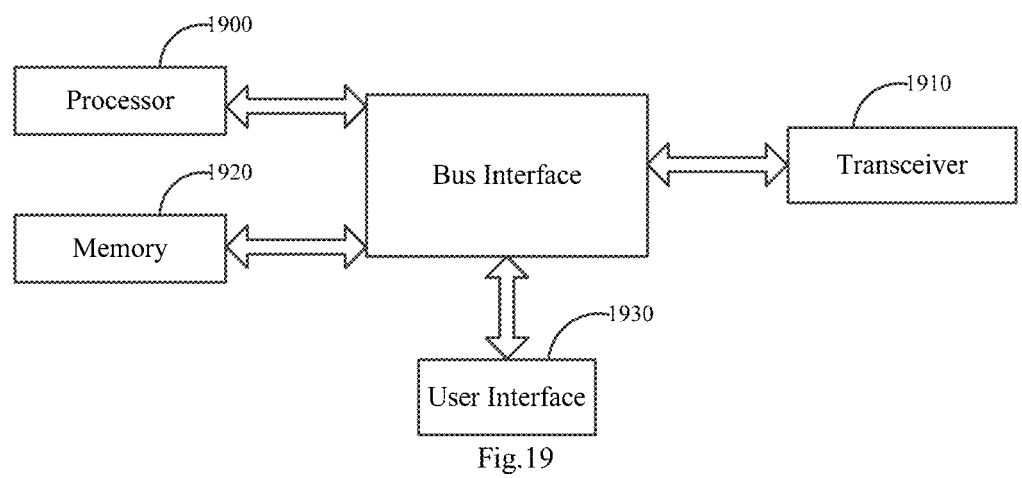
FIG. 19 is a schematic view showing a UE for using a D2D relay node according to one embodiment of the present disclosure.

Referring to FIG. 19, the present disclosure further provides in some embodiments a UE, which includes a processor 1900, a memory 1920 and a transceiver 1910. The processor 1900 takes charge of managing the bus architecture as well as general processings. The memory 1920 is configured to store therein data for the operation of the processor 1900.

The processor 1900 is configured to read a program stored in the memory 1920, to: broadcast through the transceiver 1910 a relay discovery message via a PC5 interface, the relay discovery message carrying a target relay indicator and/or a relay node identifier for the remote UE; and upon the receipt of a relay discovery response message returned by a relay node with respect to the relay discovery message, initiate the establishment of the D2D communication through the relay node.

According to the UE in the embodiments of the present disclosure, it is able to rapidly discover and use the relay node for the data transmission during the D2D discovery or D2D communication, thereby to improve the D2D discovery or D2D communication efficiency.

In a possible embodiment of the present disclosure, in the case of broadcasting through the transceiver 1910 the relay discovery message via the PC5 interface, the processor 1900 is further configured to: broadcast the relay discovery message to other UEs currently using a D2D link through a RRC message via the PC5 interface; or broadcast the relay discovery message to the other UEs currently using the D2D link through an MIB-SL message via the PC5 interface.

In a possible embodiment of the present disclosure, the processor 1900 is further configured to: in the case that the UE needs to establish D2D connection with another remote UE, initiate the establishment of the D2D communication through the relay node; or in the case that the UE needs to establish D2N connection with another remote UE, initiate the establishment of the D2N communication through the relay node.

The transceiver 1910 is configured to receive and transmit data under the control of the processor 1900.

In FIG. 19, bus architecture may include a number of buses and bridges connected to each other, to connect various circuits for one or more processors 1900 and one or more memories 1920. In addition, as is known in the art, the bus architecture may be used to connect any other circuits, such as a circuit for a peripheral device, a circuit for a voltage stabilizer and a power management circuit. Bus interfaces are provided, and the transceiver 1910 may consist of a plurality of elements, i.e., a transmitter and a receiver for communication with any other devices over a transmission medium. With respect to different UEs, a user interface 1930 may also be provided for devices which are to be arranged inside or outside the UE, and these devices may include but not limited to a keypad, a display, a speaker, a microphone and a joystick.

In a word, in the embodiments of the present disclosure, the first UE may measure its own running state, determine the first UE as the relay node in the case that the running state meets the predetermined condition in accordance with the measurement result, and notify the other UEs currently using the D2D link that the first UE is the relay node via the PC5 interface. In this way, it is able to rapidly determine the relay node for the data transmission during the D2D discovery or D2D communication, thereby to improve the D2D discovery or D2D communication efficiency.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for determining a Device-to-Device (D2D) relay node, comprising:
    measuring periodically, by a first User Equipment (UE), its own running state;
    in the case that the first UE determines that its own running state meets a predetermined condition in accordance with a measurement result, determining the first UE as a relay node, the running state being configured to at least describe a privilege or a running environment or a processing ability of the first UE; and
    notifying, by the first UE, other UEs currently using a D2D link that the first UE is the relay node via a PC5 interface,
    wherein after the first UE has notified other UEs currently using the D2D link that the first UE is the relay node via the PC5 interface, in the case that the first UE determines that its own running state does not meet the predetermined condition in accordance with the measurement result, the first UE notifies the other UEs currently using the D2D link that the first UE is not the relay node via the PC5 interface, so as to deactivate relay function of the first UE, and the first UE continues to periodically measure its own running state.

2. The method according to claim 1, wherein the step of measuring, by the first UE, its own running state comprises at least one of the following steps:
    acquiring, by the first UE, a network-side authentication result with respect to its own relay privilege;
    acquiring, by the first UE, a load of a current access network;
    acquiring, by the first UE, a signal quality measurement value of its own $U_U$ interface;
    acquiring, by the first UE, a current service handling capability of the first UE;
    acquiring, by the first UE, its own geographical position;
    acquiring, by the first UE, its own movement speed; and
    acquiring, by the first UE, a relay demand of for a current remote UE.

3. The method according to claim 2, wherein the step of, in the case that the first UE determines that its own running state meets the predetermined condition in accordance with the measurement result, determining the first UE as the relay node comprises at least one of the following steps:
    in the case that the first UE determines that the relay privilege is allowed to be used in accordance with the network-side authentication result with respect to its own relay privilege, determining the first UE as the relay node;
    in the case that the first UE determines that the load of the current access network is smaller than a predetermined threshold, determining the first UE as the relay node;
    in the case that the first UE determines that the signal quality measurement value of its own $U_U$ interface is greater than a predetermined threshold, determining the first UE as the relay node;
    in the case that the first UE determines that the current service handling capability of the first UE is greater than a predetermined threshold, determining the first UE as the relay node;
    in the case that the first UE determines that the first UE is located at a cell edge, determining the first UE as the relay node;
    in the case that the first UE determines that its own movement speed is smaller than a predetermined threshold, determining the first UE as the relay node; and
    in the case that the first UE determines that the relay demand of the current remote UE is greater than a predetermined threshold, determining the first UE as the relay node.

4. The method according to claim 1, wherein the step of notifying, by the first UE, the other UEs currently using the D2D link that the first UE is the relay node via the PC5 interface comprises:
    notifying, by the first UE, the other UEs currently using the D2D link that the first UE is the relay node through a Radio Resource Control (RRC) message via the PC5 interface, the RRC message carrying a relay indicator and an identifier of the first UE; or
    notifying, by the first UE, the other UEs currently using the D2D link that the first UE is the relay node through a Master Information Block-Side Link (MIB-SL) message via the PC5 interface, the MIB-SL message carrying the relay indicator and the identifier of the first UE.

5. The method according to claim 1, further comprising:
    receiving, by the first UE, a relay discovery message from a remote UE within a predetermined range, the relay discovery message carrying target relay indicators and/or relay node identifiers; and
    in the case that the first UE determines in accordance with the relay discovery message that its own identifier successfully matches any target relay indicator and/or relay node identifier, transmitting, by the first UE, a relay discovery response message to the remote UE, to indicate the remote UE to establish the D2D communication.

6. A method for using a Device-to-Device (D2D) relay node, comprising:

receiving, by a remote User Equipment (UE), notification messages from other UEs within a predetermined range, the notification message being transmitted in the case that the other UE has determined that its own running state meets a predetermined condition, the running state being configured to at least describe a privilege or a running environment or a processing ability of any of the other UEs; and determining, by the remote UE, whether or not any of the other UEs is the relay node in accordance with the notification message, wherein the determining, by the remote UE, whether or not any of the other UEs is the relay node in accordance with the notification message comprises;

acquiring, by the remote UE, a notification message from any of the other UEs, and in the case that a relay indicator carried in the notification message from any of the other UEs indicates a relay activation state, determining the any of the other UEs as the relay node, the notification message carrying a relay activation indicator and/or an identifier of the UE; or acquiring, by the remote UE, a notification message from any of the other UEs, and in the case that a relay indicator carried in the notification message from any of the other UEs indicates a relay deactivation state, determining the any of the other UEs not as the relay node, the notification message carrying a relay deactivation indicator and/or an identifier of the UE, wherein after the remote UE determines the any of the other UEs as the relay node, the remote UE continues to receive one or more notification messages from the any of the other UEs, in the case that the remote UE determines that the relay indicator carried in the one or more notification messages from the any of the other UEs indicates the relay deactivation state, the remote UE determines the any of the other UEs not as the relay node.

7. The method according to claim 6, further comprising:
broadcasting, by the remote UE, a relay discovery message via a PC5 interface, the relay discovery message carrying a target relay indicator and/or a relay node identifier for the remote UE; and upon the receipt of a relay discovery response message returned by the relay node with respect to the relay discovery message, initiating, by the remote UE, the establishment of the D2D communication through the relay node.

8. The method according to claim 6, further comprising:
in the case that the remote UE needs to perform D2D connection with another remote UE, initiating, by the remote UE, the establishment of the D2D communication through the relay node; or in the case that the remote UE needs to perform Device-to-Network (D2N) connection with a network side device, initiating, by the remote UE, the establishment of the D2N communication through the relay node.

9. A method for determining a Device-to-Device (D2D) relay node, comprising:
receiving periodically, by a first UE, a relay discovery message from a remote User Equipment (UE) within a predetermined range, the relay discovery message carrying target relay indicators and/or relay node identifiers; and in the case that the first UE has determined in accordance with the relay discovery message that its own identifier successfully matches any target relay indicator and/or relay node identifier, transmitting, by the first UE, a relay discovery response message to the remote UE, to indicate the remote UE to perform the D2D communication, wherein after the first UE has indicated the remote UE currently using the D2D link that the first UE is the relay node via the PC5 interface, in the case that the first UE determines that its own running state does not meet the predetermined range in accordance with the relay discovery message, the first UE notifies the remote UE currently using the D2D link that the first UE is not the relay node via the PC5 interface, so as to deactivate relay function of the first UE, and the first UE continues to periodically receive the relay discovery message from the remote UE.

10. A method for using a Device-to-Device (D2D) relay node, comprising:
broadcasting, by a remote User Equipment (UE), a relay discovery message via a PC5 interface, the relay discovery message carrying a target relay indicator and/or a relay node identifier for the remote UE; and upon the receipt of a relay discovery response message returned by a relay node with respect to the relay discovery message, initiating, by the remote UE, the establishment of the D2D communication through the remote node, wherein after the remote UE initiates the establishment of the D2D communication through the remote node, the remote UE continues to receive the relay discovery response message returned by the relay node, in the case that the remote UE determines that the target relay indicator and/or the relay node identifier for the remote UE carried in the relay discovery message indicates a relay deactivation state, the remote UE determines the relay node not as the relay node any more.

11. The method according to claim 10, wherein the step of broadcasting, by the remote UE, the relay discovery message via the PC5 interface comprises:
broadcasting, by the remote UE, the relay discovery message to other UEs currently using a D2D link through a Radio Resource Control (RRC) message via the PC5 interface; or broadcasting, by the remote UE, the relay discovery message to the other UEs currently using the D2D link through an MIB-SL message via the PC5 interface.

12. The method according to claim 10, further comprising:
in the case that the remote UE needs to establish D2D connection with another remote UE, initiating, by the remote UE, the establishment of the D2D communication through the relay node; or in the case that the remote UE needs to establish D2N connection with another remote UE, initiating, by the remote UE, the establishment of the D2N communication through the relay node.

13. A User Equipment (UE) for determining a Device-to-Device (D2D) relay node, comprising a processor, a memory and a transceiver, wherein the UE is a first UE,
the processor is configured to read a program stored in the memory, to: measure periodically its own running state; in the case that its own running state meets a predetermined condition in accordance with a measurement result, determine the first UE as a relay node, the running state being configured to at least describe a privilege or a running environment or a processing ability of the first UE; and notify through the transceiver other UEs currently using a D2D link that the first UE is the relay node via a PC5 interface, the transceiver is configured to receive and transmit data under the control of the processor, the processor takes charge of managing the bus architecture as well as general processings, and the memory is configured to store therein data for the operation of the processor, wherein after the first UE has notified other UEs currently using the D2D link that the first UE is the relay node via the PC5 interface, in the case that the first UE determines that its own running state does not meet the predetermined condition in accordance with the measurement result, the first UE notifies the other UEs currently using the D2D link that the first UE is not the relay node via the PC5 interface, so as to deactivate relay function of the first UE, and the first UE continues to periodically measure its own running state.

14. A User Equipment (UE) for using a Device-to-Device (D2D) relay node, comprising a processor, a memory and a transceiver, wherein the UE is a remote UE, the processor is configured to read a program stored in the memory, to: receive through the transceiver notification messages from other UEs within a predetermined range, the notification message being transmitted in the case that the other UE has determined that its own running state meets a predetermined condition, the running state being configured to at least describe a privilege or a running environment or a processing ability of any of the other UEs; and determine whether or not any of the other UEs is the relay node in accordance with the notification message, the transceiver is configured to receive and transmit data under the control of the processor, the processor takes charge of managing the bus architecture as well as general processings, and the memory is configured to store therein data for the operation of the processor, wherein the determining by the remote UE, whether or not any of the other UEs is the relay node in accordance with the notification message comprises:

acquiring, by the remote UE, a notification message from any of the other UEs, and in the case that a relay indicator carried in the notification message from any of the other UEs indicates a relay activation state, determining the any of the other UEs as the relay node, the notification message carrying a relay activation indicator and/or an identifier of the UE; or acquiring, by the remote UE, a notification message from any of the other UEs, and in the case that a relay indicator carried in the notification message from any of the other UEs indicates a relay deactivation state, determining the any of the other UEs not as the relay node, the notification message carrying a relay deactivation indicator and/or an identifier of the UE, wherein after the remote UE determines the any of the other UEs as the relay node, the remote UE continues to receive one or more notification messages from the any of the other UEs, in the case that the remote UE determines that the relay indicator carried in the one or more notification messages from the any of the other UEs indicates the relay deactivation state, the remote UE determines the any of the other UEs not as the relay node.

15. A User Equipment (UE) for determining a Device-to-Device (D2D) relay node, comprising a processor, a memory and a transceiver, wherein the UE is a first UE, the processor is configured to read a program stored in the memory, to: receive periodically through the transceiver, a relay discovery message from a remote UE within a predetermined range, the relay discovery message carrying target relay indicators and/or relay node identifiers; and in the case that its own identifier successfully matches any target relay indicator and/or relay node identifier in accordance with the relay discovery message, transmit a relay discovery response message to the remote UE, to indicate the remote UE to perform the D2D communication, the transceiver is configured to receive and transmit data under the control of the processor, the processor takes charge of managing the bus architecture as well as general processings, and the memory is configured to store therein data for the operation of the processor, wherein after the first UE has indicated the remote UE currently using the D2D link that the first UE is the relay node via the PC5 interface, in the case that the first UE determines that its own running state does not meet the predetermined range in accordance with the relay discovery messages, the first UE notifies the remote UE currently using the D2D link that the first UE is not the relay node via the PC5 interface, so as to deactivate relay function of the first UE, and the first UE continues to periodically receive the relay discovery message from the remote UE.

16. A User Equipment (UE) for using a Device-to-Device (D2D) relay node, comprising a processor, a memory and a transceiver, wherein the UE is a remote UE, the processor is configured to read a program stored in the memory, to: broadcast through the transceiver a relay discovery message via a PC5 interface, the relay discovery message carrying a target relay indicator and/or a relay node identifier for the UE; and upon the receipt of a relay discovery response message returned by a relay node with respect to the relay discovery message, initiate the establishment of the D2D communication through the relay node, the transceiver is configured to receive and transmit data under the control of the processor, the processor takes charge of managing the bus architecture as well as general processings, and the memory is configured to store therein data for the operation of the processor, wherein after the remote UE initiates the establishment of the D2D communication through the remote node, the remote UE continues to receive the relay discovery response message returned by the relay node, in the case that the remote UE determines that the target relay indicator and/or the relay node identifier for the remote UE carried in the relay discovery message indicates a relay deactivation state, the remote UE determines the relay node not as the relay node any more.

* * * * *